(12) United States Patent
Miller et al.

(10) Patent No.: US 6,785,892 B1
(45) Date of Patent: Aug. 31, 2004

(54) COMMUNICATIONS BETWEEN PARTITIONED HOST PROCESSORS AND MANAGEMENT PROCESSOR

(75) Inventors: John A. Miller, Shoreview, MN (US); Penny L. Svenkeson, Forest Lake, MN (US); Brett W. Tucker, Stillwater, MN (US); Philip J. Erickson, Shoreview, MN (US); Peter C. Wilson, Shoreview, MN (US)

(73) Assignee: Unisys, Blue Bell, PA (US)

( * ) Notice: Subject to any disclaimer, the term of this patent is extended or adjusted under 35 U.S.C. 154(b) by 656 days.

(21) Appl. No.: 09/602,791

(22) Filed: Jun. 23, 2000

(51) Int. Cl.[7] .................................................. G06F 9/46
(52) U.S. Cl. ........................ 719/313; 717/149; 712/203
(58) Field of Search ............................... 709/312, 313, 709/318, 327; 713/1, 2; 710/260, 266, 315; 712/28, 203; 719/312, 313, 318, 327; 717/149

(56) References Cited

U.S. PATENT DOCUMENTS

| | | | |
|---|---|---|---|
| 5,325,517 A | * | 6/1994 | Baker et al. .................. 714/11 |
| 5,555,420 A | * | 9/1996 | Sarangdhar et al. ......... 710/266 |
| 5,724,527 A | * | 3/1998 | Karnik et al. ................ 710/315 |
| 6,216,216 B1 | * | 4/2001 | Bonola .......................... 712/28 |
| 6,339,808 B1 | * | 1/2002 | Hewitt et al. ................ 710/260 |
| 6,370,606 B1 | * | 4/2002 | Bonola ......................... 710/260 |

* cited by examiner

Primary Examiner—John Follansbee
Assistant Examiner—Haresh Patel
(74) Attorney, Agent, or Firm—Michael B. Atlass; Mark T. Starr

(57) ABSTRACT

An inventive protocol for communicating between a management processor and host processors allows for the cooperative management of resources among host processors within a partition and also among a set of partitions in a computer system, wherein each partition may function under an instantiation of an operating system with a group of host processors. The protocol employs a message passing system using mailbox pairs in fixed but moveable or relocatable locations within the computer system shared memory. The messages share a format having specific codes or descriptors that act as codes for coordination of message interpretation. These codes include at least a validity flag and a sequence enumerator, and in a response message of a request/response message pair, a status indicator. Additionally, routing codes and function codes and code modifiers may be provided. Specific implementation details and messages are described to enable the smooth functioning of complex multiprocessor systems.

23 Claims, 9 Drawing Sheets

COMMUNICATIONS BETWEEN PARTITIONED HOST PROCESSORS AND MANAGEMENT PROCESSOR

A portion of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to protocols for multi-processor computer systems and processes therein, and has particular applicability to the Intel processors. The protocol may be used in a multiprocessor configuration with only and may be applicable to multiprocessor configurations with only non-Intel type processors as well processors or in a computer system having more than one type of processor, including non-Intel processors. (A computer system is to be thought of as any system for processing data having a single "main" memory, at least one instruction processor (a "Host" processor although in preferred configurations, a Host itself will be comprised of more than one processor) and at least one input/output (I/O) device associated therewith and controlled thereby. The invention relates to multiple processor computer systems and communications between a Host processor and a management processor that is available for managing operations of the multiprocessor computer system.)

2. Background Information

To provide flexibility in operations of multiprocessor systems using Intel processors has proven to be a challenge due to the inherent design attributes of such processors, as well as the design attributes of the operating systems which run with them. To do it in a way which allows for heterogeneity of processors and operating systems in a single computer system is even more difficult.

Described herein is a system having a protocol for communication by all the "host" processors on a computer system with a management system processor. In the preferred form, Intel brand processors or ones which follow their specifications, are used for all host processors and for the management processor(s) in the computer system. The management system processor coordinates the activities of all the host processors, accommodating the host processors' needs for system resources as communicated to the management processor.

It is important to keep in mind various valuable attributes of multiprocessor systems that allow for such a form of management system to allocate the system resources dynamically. Specifically, the protocol used should allow a management system to monitor the host system(s) and perform valuable functions to make the overall system run efficiently. Some of the functions should include partitioning into multiple partitions (each partition having an instantiation of an operating system), controlling the execution of the host operating system (start, stop, boot, etc.) and viewing the status of hardware units in the system. Ultimately, the management system should have control over the host(s).

The protocol should also be flexible, providing new messages and formats without changing the protocol itself. Also, from the Host system's perspective, the management system should look like any other I/O device to allow the management system to be connected to the host systems through any I/O port, giving substantial flexibility in how the whole system can be managed and from where. Also, it would be advantageous to be able to direct host systems as well as the management system to buffer areas in memory where substantial chunks of information can be passed.

In U.S. patent application Ser. No. 09/120,797, now abandoned entitled: COMPUTER SYSTEM AND METHOD FOR OPERATING MULTIPLE OPERATING SYSTEMS IN DIFFERENT PARTITIONS OF THE COMPUTER SYSTEM AND FOR ALLOWING THE DIFFERENT PARTITIONS TO COMMUNICATE WITH ONE ANOTHER THROUGH SHARED MEMORY, (incorporated herein in its entirety by this reference thereto) for example, it is taught how a computing system can be constructed so that a problem can be shared between partitions, leading to increases in throughput. In this cited document a number of other systems which can be employed in multiprocessor environments are mentioned in the background section. All such systems can be enhanced and take advantage of having a unique management node which can organize the manner in which the processors in a multiprocessor computer system employ the resources of the system. (Providing a redundant management node is not an unreasonable enhancement.) The management node can cooperatively reconfigure the resources of the computer system to allow for removal of parts of the system and their replacement without ever stopping the overall computer system functioning. Thus, in highly interactive transaction processing systems, for just one example, the transactions can continue to execute while segments of the computer system are removed from the system and replaced for upgrade or repair, even including sections of the main memory. Information from banks of sensors can continue to be processed while a processor or group of processors is swapped out, for another example. I/O subsystems can be brought down or added without stopping the entire system for the change, for a third example.

In U.S. patent application Ser. No. 09/362,388 now U.S. Pat. No. 6,687,818 entitled: METHOD AND APPARATUS FOR INITIATING EXECUTION OF AN APPLICATION PROCESSOR IN A CLUSTERED MULTIPROCESSOR SYSTEM, also incorporated herein by this reference in its entirety, a boot process for multiprocessor systems is described that uses some of the protocol which will be described in detail herein.

The relative ubiquity of Intel microprocessor architectures, from the so called x86 to the IA32 and IA64 and the concomitant ubiquity of Microsoft NT-type operating systems makes it important to be able to employ Intel's design in such multiprocessor systems. Enhancing commercial compatibility in a multiprocessor environment with what most of the world uses in its computing environments becomes achievable through the use of an Intel Host Protocol. With a properly configured BIOS, one can use the inventively designed protocol communications to direct the activities of such processors to memory locations that assign specific resources to each such processor. However, the difficulties are multiplied by the fact that all memory locations in a multiprocessor computer system that employs a single memory unit (or single memory unit group for the main memory function for all the processors) must be assigned to each Intel processor so that the individual memory map of the Intel processor (or whichever other processor type might employ this inventive protocol) operates effectively in such a system.

When in operation in a multiprocessor system, these processors, are called "host" processors since they provide the processing hardware services to the applications and operating system software for their partition of the computer system.

SUMMARY OF THE INVENTION

Figure 1:
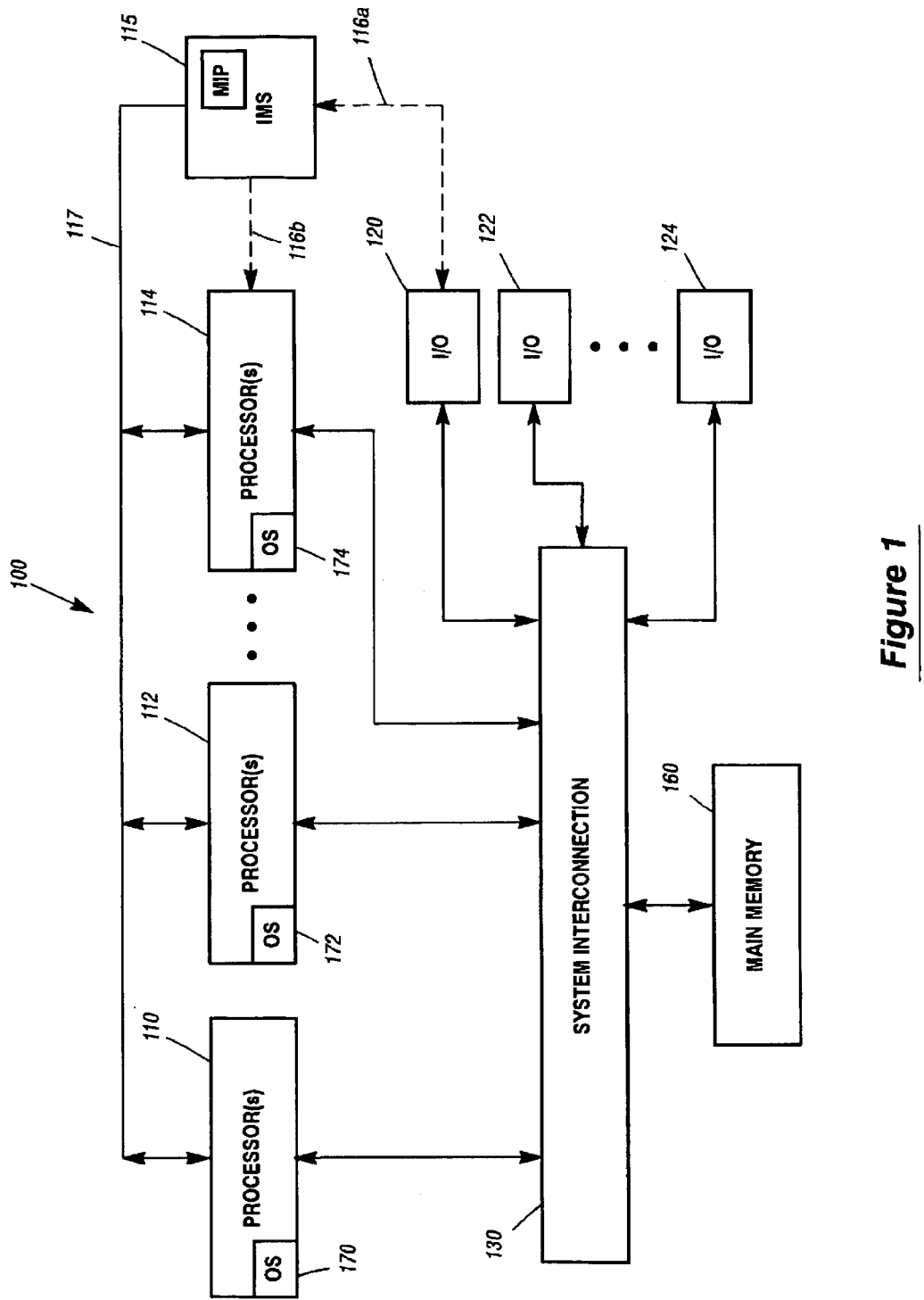
FIG. 1 is a block diagram of a multiprocessor computer system for use with the invention.

An inventive protocol, its features, functions and operative elements for communicating between a management processor and host processors is described herein. This protocol allows for the cooperative management of resources among a plurality or multiplicity of host processors within a partition and also among a set of partitions in a computer system, wherein each partition may function under an instantiation of an operating system with a group of host processors.

Specifically the protocol employs a message passing system using mailbox pairs in fixed but moveable or relocatable locations within the computer system shared memory. The messages share a format having specific codes or descriptors that act as codes for coordination of message interpretation. These codes include at least a validity flag and a sequence enumerator, and in a response message of a request/response message pair, a status indicator. Additionally, routing codes and function codes and code modifiers may be provided.

The message passing system provides a basis for conversations between host and Management processors to provide a heretofore unavailable level of control over the system. These conversations or dialogs comprise a set of message pairs that can allow coordination of maintenance activities, allocation of system resources and adaptive use and modification of the protocol itself.

Short usage process algorithms are described that enable use of the mailboxes with these codes.

For the protocol to function smoothly, each partition will have its own mail box pair and communication between a multiprocessor host partition and a management processor will be coordinated by a single processor in the host, designated the "BSP" (for "Boot Strap Processor"). The management processor and its supporting hardware can be thought of as a node on the computer system. It, together with the software that provides management functions is also called an Integrated Management System or IMS.

Both the management processor (sometimes called the "MIP", running under the control of an Integrated Management Software program or "IMS") and a host BSP will use memory within the partition owned by that host for these mail box pairs. The same address translation hardware can advantageously be used to keep the system software parsimonious, but this requires hard-wiring of connections between each BSP processor module and the management processor. This hardwiring configuration is preferred but not required. In this preferred form, a linking module in a crossbar interconnect (which links the processors with the computer system main memory) is directly connected to "feedthrough" pins in a MIP node. This limiting module enables the routing of signals directly from the management processor to the BSP and other processors within the BSP's domain, by passing messages through the address translation hardware of the crossbar interconnect (which is also used by this BSP) to reach main memory locations, and through the address translation hardware of the Sub-POD on which each processor in the BSP's domain is physically located to provide appropriate address translation for the crossbar translator hardware. This linking module may in some embodiments also allow for direct passing of signals to the processor, for example, to let the processor out of a reset condition.

A less preferred solution to communicating messages in paired mailboxes in fixed and moveable locations as taught herein could employ software translation from domain to domain across the system wide main memory unit of the addressing schemes from each of the partitions "controlled" by the management processor. In such a system, the need for hard-wired connections to individual processors would be obviated.

An I/O port fixed location could also be substituted where the I/O port address translation hardware handles the conversion for each message to specified processors.

Yet another system could use dedicated real memory locations in the system main memory for mail box messaging for each processor, but some of the flexibility provided by the preferred embodiment would be lost.

A list of messages currently used in this inventive protocol and their use in a multiple processor computer system environment is detailed within. Also described is the system of dialogues available with the protocol using the messages to coordinate the control of the multiprocessor system.

To provide additional flexibility, one of the message pairs allows for negotiation of versions between the host and the management processors so that new host software entity that communicates with the management processors, including but not limited to BIOS versions can be included in the multiprocessor system and yet remain coordinated within the overall system, and so that additional messages may be developed and used in the protocol as design considerations may warrant. Another message pair allows for relocation of the message pair mailbox locations within the main memory system controlled by a host. In all, 39 message pairs are described for the preferred embodiment system, with only 10 of those being originated by the MIP.

Many other features and limitations are described in the detailed description below.

DETAILED DESCRIPTION OF THE PREFERRED EMBODIMENTS

The multiprocessor system should first be described to enable an understanding of the way the protocol can function in it. Then the protocol itself can be described. Finally, the operation of the protocol in the system can be described, and conclusions drawn. Accordingly, the detailed description is in four parts.

Part 1. Preferred Embodiment System Description

FIG. 1 illustrates a multi-processor system that includes at least the processor modules 110, 112, and 114. Processor modules 110, 112 and 114 are of comparable compatibility in that they at least can communicate through the system interconnect to the main memory and I/O using the same protocol. In the preferred embodiments all of these processor modules will be Intel architecture processors, however, the present invention further contemplates that heterogeneous processors and/or operating systems can co-exist. Each processor module 110, 112 and 114 is self-contained. The processor modules 110, 112 and 114 can each include a plurality of processors. Two or more of processor modules 110, 112 and 114 share access to main (or global) memory 160 and/or to I/O devices 120, 122, and 124, typically through a system interconnection mechanism, such as system interconnection 130. In preferred embodiments this interconnection device is a non-blocking cross-bar switch. Processor modules 110, 112, and 114 can communicate with each other through main memory 160 (by messages and status information left in common data areas) as defined in some detail in the previously incorporated patent application U.S. patent application Ser. No. 09/120,797.

Also in the preferred embodiment, one or more processor modules can be configured, as a separate partition within the computer system, such that multiple partitions may exist within the computer system, each partition operating under the control of a separate operating system. For example, each processor module 110, 112 and 114 of FIG. 1 can be defined as a separate partition controlled via a separate operating system 170, 172 and 174. As employed in one preferred embodiment, each operating system 170, 172 and 174 views main memory separately as though each is the only entity accessing main memory 160, although it is possible that a single operating system could be shared among more than one of the processors 110, 112, and 114.

Also in the preferred embodiment, each of the processors illustrated in FIG. 1 is a unit containing a plurality of processors functioning together as a single computing entity within a partition. Refer to the description of FIG. 2 for detail regarding this aspect of the configuration.

A distinction should be made between multi-processor systems and multi-computer systems. A multi-computer system is a system in which computers are interconnected with each other via communication lines to form a computer network. The computers are autonomous and may or may not communicate with each other. Communication among the computers is either via fixed paths or via some message-switching mechanism. On the other hand, a conventional multi-processor system is controlled by one operating system that provides interaction between processors and all the components of the system cooperate in finding a solution to a problem. Using the invention described herein, a multi-processing system may share many system resources, including even main memory, among more than one instance of an operating system and/or among more then one kind of operating system.

In the multiprocessor system 100 of FIG. 1, there is also an entity for managing the system called an Integrated Management System or IMS 115 which contains a management processor or MIP. This MIP processor is compatible with the inventive protocol. Since the protocol was designed to enhance management communications with the Intel IA32 and IA64 architectures, at least these chips will be compatible with the protocol.

The IMS system in the preferred embodiment contains a link to a hard-wired connection to each of the processors through a link on the circuit board on which the processor resides, by which the IMS can let these host processors out of reset, an action which allows them to boot themselves up. This hard-wired connection is illustrated as line 117. The routing of this bus can also be used for other purposes. For example, on the Intel chips currently sold and those anticipated, a pin called RESET must be addressed directly in order to cause a reset which when released will cause or allow the processor chip to run using the memory location it will look to load a boot program called a BIOS. It is possible to connect some other way to this pin from off the processor's board, but at the present time, it is preferred to employ a unique bus for this purpose.

For the instant invention, the protocol messages from the IMS MIP are passed over a hardwired connection 117 to the memory locations through the address translation modules associated with the processors linked through the connection 117. Because an electrical bus such as this is in place in our computer systems, it is advantageous to use it to communicate all messages to the processors from the IMS, and vice-versa through such a pathway. As mentioned in the Summary section above, other communications pathways for the protocol can be established using direct to processor communications pathways or through I/O bridges 116*b* and 116*a*, respectively, however, in our system it is preferred to use a linker system which here is illustrated by line 117.

Details of how a preferred system for employing this protocol can be booted up are described in previously filed U.S. patent application Ser. No. 09/362,388, now U.S. Pat. No. 6,687,818 entitled: METHOD AND APPARATUS FOR INITIATING EXECUTION OF AN APPLICATION PROCESSOR IN A CLUSTERED MULTIPROCESSOR SYSTEM, incorporated herein in its entirety by this reference.

Once the processors are running, communication between them and the IMS processor (Management Instruction Processor or MIP) is accomplished by use of the linker system 50, described with reference to FIG. 4 in detail below.

Figure 2:
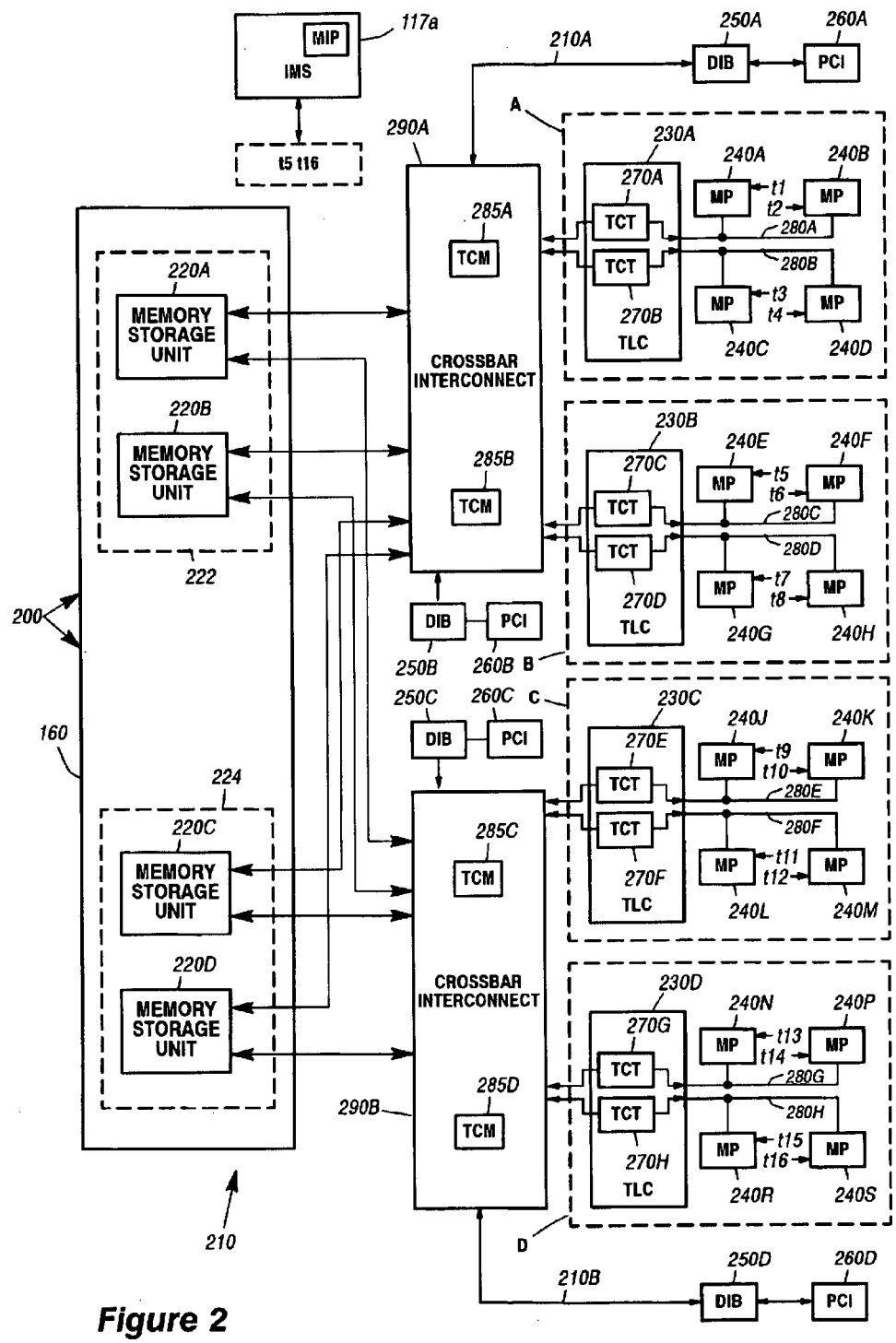
FIG. 2 is a block diagram of a multiprocessor computer system similar to that of FIG. 1 with substantially more detail.

Please now refer to FIG. 2 which is an illustration of a preferred embodiment of a computer system 200 for use with the present invention. Computer system 200 includes a main memory, illustrated here as main memory 160, and a plurality of processing modules A–D (having parts surrounded in dotted lines for clarity and sometimes called "Sub-PODs") connected to the main memory via respective third level cache modules 230A–D and crossbar interconnects 290A and 290B.

In the present embodiment, main memory 160 is a directory-based memory system and is capable of supporting various memory consistency models. Main memory 160 includes a plurality of memory storage units (MSUs) 220, such as memory storage units 220A, 220B, 220C, and 220D. Preferably, each memory storage unit 220A, 220B, 220C, and 220D includes at least eight gigabytes of memory. Preferably too, each memory storage unit 220A, 220B, 220C, and 220D includes sixteen semi-independent banks that share four double-wide data busses and eight unidirectional address busses. Alternatively, we could provide a unitary MSU of any size, rather than the set of separate units, but multiple memory units provides additional flexibility to customers so such systems are currently preferred.

The plurality of third level cache modules 230, such as third level cache modules 230A through 230D, include a plurality of third level cache translators that preferably include application specific integrated circuits (called TCTs), such as TCTs 270A through 270H. In the present embodiment, pairs of processors (e.g., 240A and 240B) share a common bus (e.g., 280A) with a single TCT (e.g., 270A) within a given third level cache (TLC) in a Sub-POD (e.g., 230A). Each TCT 270 performs address relocation, reclamation, and translation for memory addresses issued by the processors to which it is connected, so that the processor has the same kind of memory to work from as its processor was designed to work with, regardless of the pagination of the main memory 160's organization. The details of how such translation can be accomplished with memory sharing are described in U.S. patent application Ser. No. 09/120,797. It is sufficient for our purposes here to mention that when one of the processors of a processing module of a given partition issues an address on its address lines ("the referenced address" or "processor address"), the TCT 270 for that processor adjusts the address for any relocation, reclamation, or shared windowing, as required, to produce the address of the corresponding location in the main memory 160. As described in the U.S. patent application Ser. No. 09/120,797, now abandoned the TCTs 270 provide a means mapping the physical address space of the processors in each partition to the respective exclusive memory windows assigned to each partition, and, more specifically, a means for relocating a reference to a location within the physical address space of the processors on a respective partition to the corresponding location within the exclusive memory window assigned to that partition. As also described, in a similar manner, the TCMs 285 perform any relocation or reclamation required for memory addresses received from an I/O processor (e.g., PCI card) communicating via a DIB 250A or 250D and TCM to main memory.

Each third level cache module 230A through 230D is connected to a respective plurality of processors (MPs) 240A through 240S. Specifically, in the present embodiment, each TLC 230 is connected to up to four processors. Each TLC 230 and its respective group of MP processors define a Sub-POD. Further according to the present embodiment, two Sub-PODs are connected via a crossbar interconnect (e.g., crossbar interconnect 290A or 290B) to form a POD. Thus, in the embodiment illustrated in FIG. 2, there are four Sub-PODs connected via crossbar interconnects 290A and 290B, respectively, to form two PODs.

In operation, memory storage units 220 bi-directionally communicate with third level cache modules 230, through crossbar interconnects 290. Crossbar interconnects 290 bi-directionally communicate with direct I/O bridges 250 via I/O buses 210, and with processors 240 through TCTs 270. Direct I/O bridges 250 bi-directionally communicate with peripheral component interconnects 260.

In the present embodiment, the processors (MPs) 240 may comprise Intel processors (e.g., Pentium Pro, Pentium II Xeon, Merced), Unisys E-mode style processors (used in Unisys A Series and ClearPath HMP NX enterprise servers), or Unisys 2200 style processors (used in Unisys 2200 and ClearPath HMP IX enterprise servers. It is contemplated that processors from other manufacturers with compatible addressing schemes and work lengths or with translations suitable to those otherwise compatible could be used. Preferably, a given Sub-POD employs four processors of the same type. However, the present invention contemplates that different Sub-PODs may employ different types of processors. For example, one Sub-POD may employ four Intel processors, while another Sub-POD may employ four Unisys E-mode style processors. In such a configuration, the Sub-POD that employs Intel processors may be defined as one partition and may run under the control of an Intel-compatible operating system, such as a version of Unix or Windows NT, while the Sub-POD that employs Unisys E-mode style processors may be defined as another partition and may run under the control of the Unisys MCP operating system. As yet another alternative, the Sub-PODs in two different partitions may both employ Intel processors, but one partition may run under the control of an Intel compatible operating system (e.g., Windows NT), while the other partition may run under the control of the Unisys MCP operating system through emulation of the Unisys A Series computer architecture on the Intel processors in that partition. Various other configurations are certainly possible and contemplated so that for example the UnixWare or Solaris operating systems as well as others could be used without exceeding the scope of the invention.

Additional details of the architecture of the preferred embodiment of the computer system 200 of FIG. 2 are provided in the following co-pending, commonly assigned applications listed following this paragraph, each of which is incorporated herein by this reference in their respective entireties.

"A Directory-Based Cache Coherency System," Ser. No. 08/965,004, now abandoned Filed Nov. 5, 1997.

"Split Lock Operation To Provide Exclusive Access To Memory During Non-Atomic Operations," Ser. No. 08/964,623, Filed Nov. 5, 1997.

"Message Flow Protocol for Avoiding Deadlocks," Ser. No. 08/964,626, now U.S. Pat. No. 6,092,156 Filed Nov. 5, 1997.

"Memory Optimization State," Ser. No. 08/964,626, now U.S. Pat. No. 6,052,760 Filed Nov. 5, 1997.

"System and Method For Providing Speculative Arbitration For Transferring Data," Ser. No. 08/964,630, now U.S. Pat. No. 6,049,845 Filed Nov. 5, 1997.

"High Performance Modular Memory System with Crossbar Connection," Ser. No. 09/001,592, now U.S. Pat. No. 6,480,927 Filed Dec. 31, 1997.

"Programmable Address Translation System," Ser. No. 09/001,390, now U.S. Pat. No. 6,356,991 Filed Dec. 31, 1997.

"High-Speed Memory Storage Unit for a Multiprocessor System Having Integrated Directory and Data Storage Subsystem," Ser. No. 09/001,588, now U.S. Pat. No. 6,415,364 Filed Dec. 31, 1997.

"Directory Based Cache Coherency System Supporting Multiple Instruction Processor and Input/Output Caches," Ser. No. 09/001,598, now U.S. Pat. No. 6,587,931 Filed Dec. 31, 1997.

"Bi-directional Interface Distributed Control Mechanism," Ser. No. 09/096,624, now U.S. Pat. No. 6,182,112 Filed Jun. 12, 1998.

"Source Synchronous Transfer Scheme," Ser. No. 09/097,287, now U.S. Pat. No. 6,199,135 Filed Jun. 12, 1998.

"Queuing Architecture for Use in a Data Processing System Having Independently-Operative Data & Address Interfaces," Ser. No. 09/096,822, now U.S. Pat. No. 6,178,466 Filed Jun. 12, 1998.

A POD is defined as a unit having four MP processors (in this embodiment), two TLC's and a crossbar interconnect module with it's two TCM's. A POD could have less than the maximum number of processors in it, if desired, and may even have only one Sub-POD with a single processor in that Sub-POD if desired.

In the present embodiment, a maximum configuration of the computer system 200 includes four PODs as described above, which would be double in size of the computer system 200. Thus, in the maximum configuration, a computer system would include (4 PODs) * (8 processors per POD)=32 processors. Computer system 200 can be partitioned on any combination of POD or Sub-POD boundaries. It is understood, however, that the present invention contemplates other multiprocessing environments and configurations. For example, computer system 200 could be expanded by plugging in more memory storage units 220 and more PODs or Sub-PODs.

PODs can be defined to include direct I/O bridges (DIBs) 250A and 250B which communicate with main memory through the crossbar of the respective pod.

Further according to the present invention, multiple partitions within the computer system, each of which may comprise one or more PODs or Sub-PODs, each operates under the control of a separate operating system. The operating systems executing on the different partitions may be the same or different. For example, the present invention contemplates an environment wherein at least two of the operating systems are different and one operating system does not control or manage the second operating system.

Figure 3A:
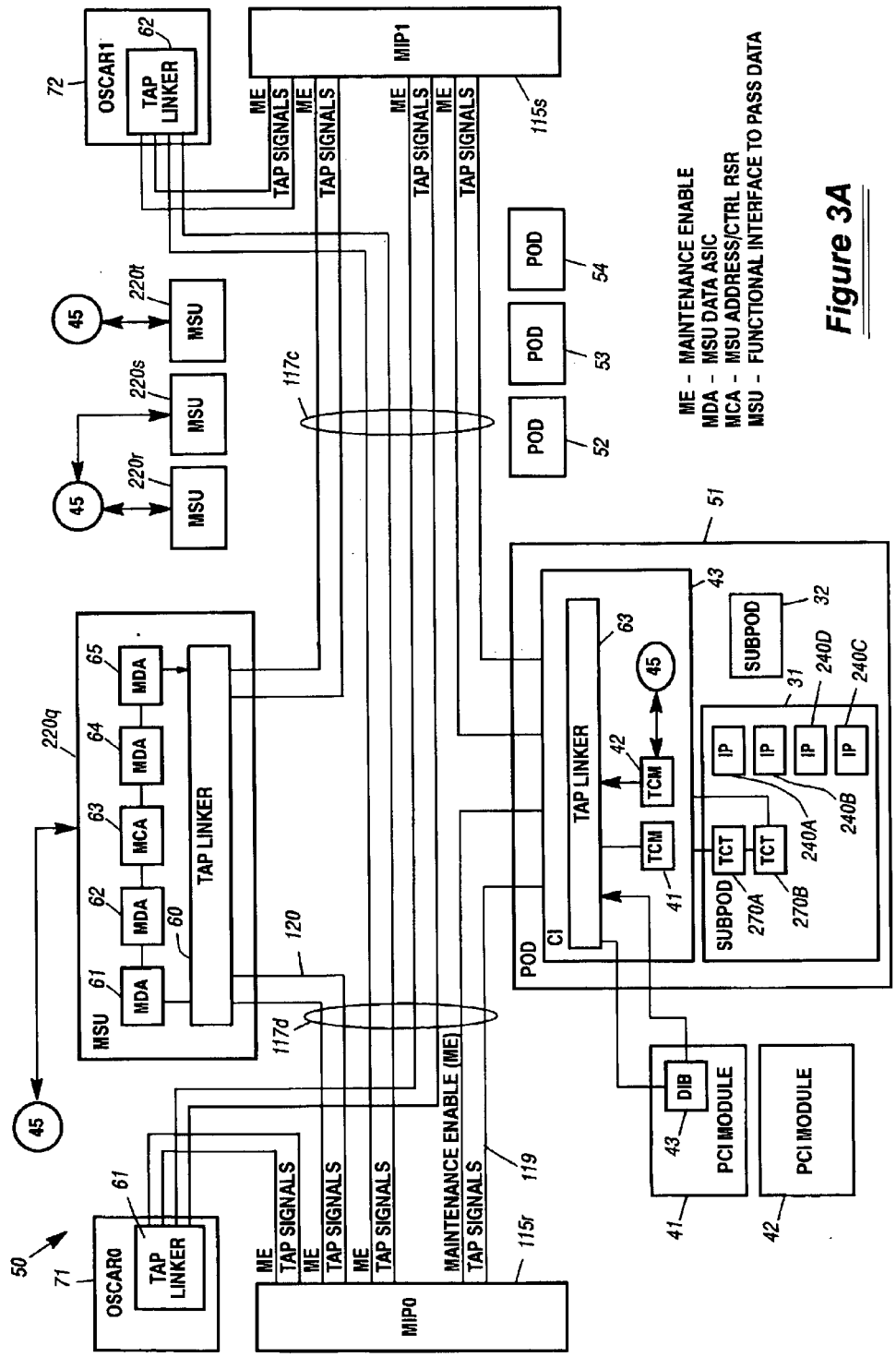
FIG. 3A is block diagram of a preferred embodiment linker system for communication of the protocol between at least one management processor system and the processors of the computer system.

Refer now to FIG. 3, in which the Linker System 50 is shown comprised of at least MIP (Management Instruction Processor), a series of communication lines 117d, and tap linker buses or switching hardware 60 and 63. In this block diagram, a redundant MIP system is also shown which provides additional flexibility to the architecture. This MIP1 115s has its feed-through signal lines indicated as 117c. Accordingly, explanation will refer only to the single MIP system illustrated as MIP0 115r and it will be understood that this explanation applies also to MIP1.

Timing coordination of the overall system is provided through an oscillator block 71 which has its own tap linker 61. This provides essential clocking features so that all the signals are coordinated in time. In the preferred embodiment the MIP issues a maintenance enable signal on the ME lines whenever it wants to send a communication. As was illustrated in FIG. 2, the multiprocessor computer system comprises a series of Memory Storage Units or MSU's like MSU's 220q–220t. Each one of these MSU's will have a tap linker 60 for communicating messages from and to the MIP. (The addressing and control of the MSU's are controlled through ASICs 61–65 as is understood in the art, here having two types, one MCA for address and control and the others for passing data). The tap linker system is not required for the communications pathway between the processors (like IPs 240A–D), as will become clear in discussion of the FIG. 3B diagram describing the use of the linker to allow the MIP to communicate with mailboxes in the MSU (like 220Q).

As was also described with reference to the computer system, a number of PCI modules 41, 42, are connected to the crossbar interconnect 43 through a data interface bus DIB 43. Also, as was illustrated in FIG. 2, a pair of Sub-PODs 31 and 32 may be connected through a crossbar interconnect 43 to the memory storage units. To simplify the explanation, a memory storage unit functional interface 45 is illustrated here which provides a link between the linker 63 as well as the Sub-PODs (31) via the crossbar interconnect or system interconnect here illustrated as CI43. (The system of interconnects between the MSU's and CI's which is the system of ports labeled 45 in this illustration and used in this preferred embodiment is described in substantially more detail in U.S. patent application Ser. No. 09/001,592, incorporated herein in its entirety by this reference. However, it is sufficient to note for the purposes of this discussion that there is a pathway independent from the tap linkers that provides a data channel between the PODs and the MSUs.) The maintenance enable signals are used by the linker 63 to allow only one (1) MIP to communicate with the linker 63 at any time. In the preferred embodiment a maximum of two (2) MIPs may be used in a computer system.

Messages in the protocol, may be sent on the signal line 119 to the linker 63 by the MIP. The linker 63 takes advantage of the translation hardware TCM 41 and TCM 42 to map the message to the appropriate space in the memory unit wherein the mail box the MIP wishes to write to is located. The linker 63 transfers this message data across the MSU functional interface 45 to the appropriate location in the main memory. (More detail regarding this transfer is had in the description of FIG. 3B). As was illustrated in the earlier figures, the main memory can be comprised of a set of MSU units and the address translation hardware will have been configured for the appropriate partition prior to the MIP using the address translation hardware in crossbar interconnect 43.

At start up, all host processors will be pointing to the same main memory mailbox locations and the MIP will use the address translation hardware of the main memory in as unit 6.0.

It should be noted that an additional signal line 120 is provided to a linker unit 60 within a MSU 220q. This signal line 120 may be used to load messages into mailboxes prior to the boot sequence being completed.

Figure 3B:
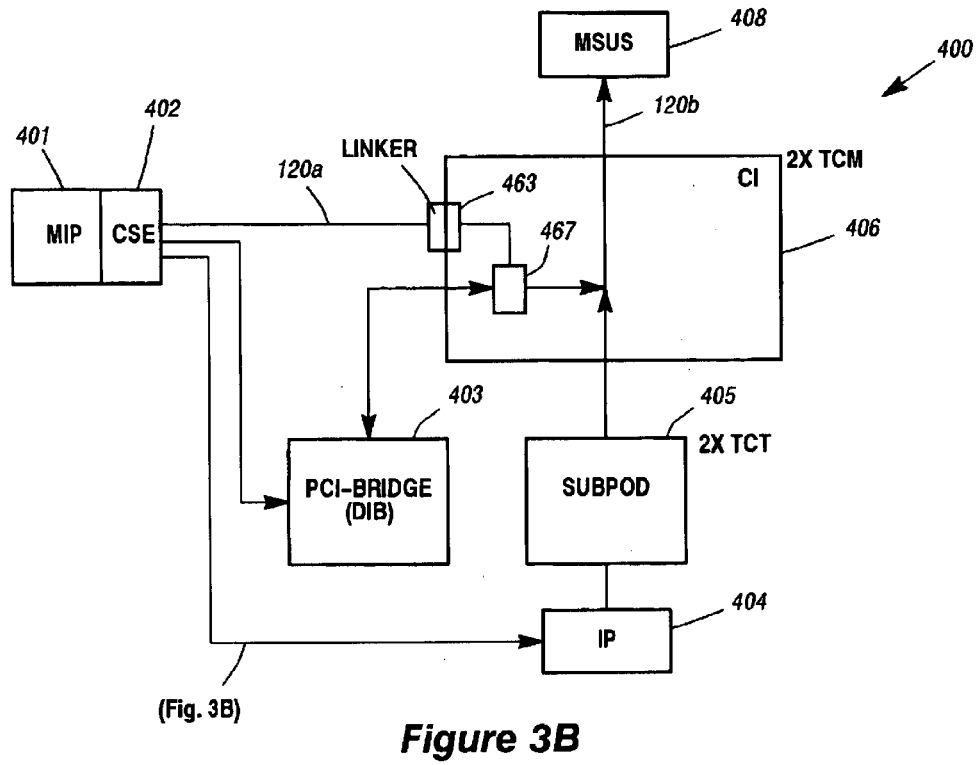
FIG. 3B is a block diagram identifying how the linker system of FIG. 3A establishes an electrical pathway between a MIP system and an MSU.

Referring to FIG. 3B, the block diagram 400 illustrates electrical pathways by which the MIP system 401 can communicate through to the main memory storage unit system 408. The common scan interface 402 is the equivalent of the communication feed-through lines 117d in FIG. 3A. Thus, line 120a is the equivalent of line 120 in FIG. 3A. This allows for direct transfer of data into the linker system 463 in the crossbar interconnect system 406. You will recall from FIG. 2 that the crossbar interconnect system contained a pair of ASICs which are here illustrated as block 467 which supply address translation capability to the system so that the host processor using such ASIC can receive information from an address it asks for from what that address corresponds to within the MSU. Since the integrated management system software running the MIP 401 is aware of which processor it is communicating with, it is also aware of the range of memory to which this ASIC has access in the main storage unit 408. Initially, the address is a predetermined (fixed) address which is within the range of addresses which may be accessed by that processor and by the ASICs. One of the messages of the protocol allows the host Operating System to change the address at which messages are read/written. The ASIC 467 will then route the data directly to the main storage unit mailbox for the MIP across line 120b, just the way it would if the request to send information to the MSU were coming from the host processor, using the Host's address translation hardware and the Host's in addressing the Host's memory range. This same pathway can be used for reading and writing memory locations by the MIP in the main storage unit, with no intervention by the instruction processor running the partition in that main storage unit to which the MIP communication is directed. In the preferred embodiment, requests from a host processor IP 404 or a MIP, will have equal priority to employ the ASIC translation function and the ASIC block 467 will serve them on a first come first served basis.

Note that there is also connection via the feed-through or common scan interface 402 to a PCI-bridge, DIB403. This allows the MIP to communicate data through the same ASIC 467 as if the MIP is a peripheral subsystem of the overall computer system.

Finally, as is described in more detail in FIG. 3B, an additional direct electrical pathway is set-up between the MIP through the common scan interface 402 to each instruction processor 404. The instruction processor communication through the Sub-POD 405 and the crossbar interconnect 406 is illustrated in more detail in FIG. 2.

Figure 3C:
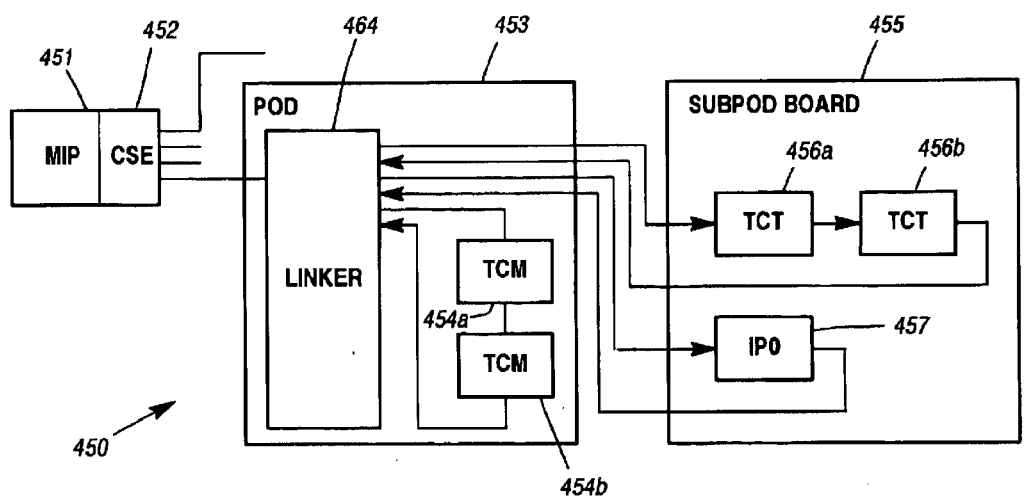
FIG. 3C is a block diagram identifying how the linker system of FIG. 3A establishes an electrical pathway between a MIP system and an individual host processor on a Sub-POD board.

Referring now to FIG. 3C, the MIP system 451 with its common scan interface 452 is shown connected through the linker system 464 in POD 453 to the instruction processor 0 (457) in Sub-POD board 455. This electrical pathway is consistent with those indicated as $t_{1-16}$ in FIG. 2.

The memory translation hardware ASICs 454a and 454b, it should be noted, are the equivalent of box 467 in FIG. 3B. These ASICS are connected through the linker subsystem 464 in POD 463, thus, the communication pathway through the linker 464 can be used to reach the partition memory locations for the mailbox addressable by the MIP.

Figure 4:
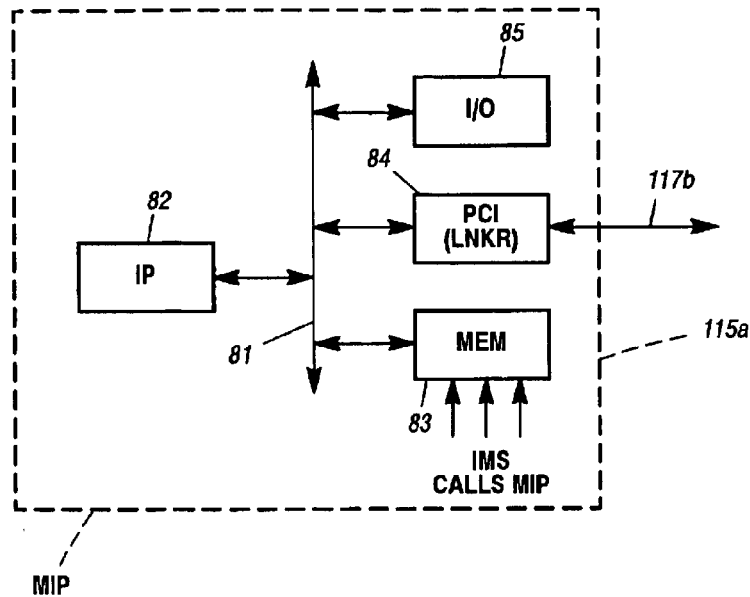
FIG. 4 is a block diagram of an integrated management system.

The MIP system 115a is illustrated in more detail in FIG. 4. The signal lines and maintenance enable lines extend from the MIP hardware box 115a (also referred to generally as running the Integrated Management System or IMS software) as line 117b. This is connected to a PCI card containing the MIP end of the CSE(common scan engine) 84 which in turn is connected to a system bus 81 controlled by the CPU (or Instruction Processor) 82. A memory subsystem 83 and input/output controller 85, provide the functional elements necessary for the software to operate as an Integrated Management System (IMS), employing the inventive protocol to monitor and control the multiprocessor computer system (not shown in this figure).

Part 2. Preferred Embodiment Protocol

The protocol functions in the multiprocessor computer system to provide a process and system to communicate between the MIP and the host processors. The communications are by way of a mailbox system which is described in the next section. The format of the mailbox request message is the same for all messages used in the protocol. There are two basic forms, a REQUEST and a RESPONSE message. These in the preferred embodiment have particular forms but so long as the required elements for the functions are present various forms can be used.

The REQUEST form is organized as a 00–3F$_{hex}$ bit (64$_{10}$ bit) message format. This is the same size as the Intel cache line. Therefore it is convenient, and therefore preferred, to use the same size messages for replies as requests, even though the replies could be made shorter since they don't really need to carry a buffer address. (Since the cache line is going to cost as much time to write as a shorter message, it is unlikely that there would be any benefit from shortening the message size). Likewise, in designing the form of the message it could be made shorter if the buffer is in a separate piece and two lines are used, however, again, sufficient space for a buffer is available in the Intel cache line and therefore with the additional simplicity and reduced cost and complexity the message format design we teach is preferred. Only one order preference should be mentioned, however. The valid flag is in the last byte in the mailbox to allow the MIP software to write the mailbox in one operation and be assured that the valid flag will be written last, independent of the hardware implementation. This will allow the mailbox message size to grow beyond both the one cache line and also if the next generation of processor uses a larger cache line, this too can easily be supported.

The form is set out in the following table:

TABLE 1

REQUEST mailbox format.

| 7 | 6 | 5 | 4 | 3 | 2 | 1 | 0 | byte |
|---|---|---|---|---|---|---|---|---|
| valid flag | | | | | | | | 3f-38 |
| | | | | | | | | 37-30 |
| | | | | | | | | 2f-28 |
| | | | | | | | | 27-20 |
| | | | | | | | | 1f-18 |
| | | | | buffer size (if code modifier bit 6 is set) | | | | 17-10 |
| buffer address (if code modifier bit 6 is set) | | | | | | | | 0f-08 |
| sequence number | | | | code modifiers | MIP routing code | host routing code | function code | 07-00 |

Note that a byte is 8 bits, and each column represents a byte. The descriptions below define what is in each column or set of columns that represents a reserved area in the message format defined in the table. If a buffer is used in a message, this means the buffer at another location (identified by the buffer address and buffer size information) will contain information needed by the message recipient for the communication to be complete. The information in the buffer address/size areas may be coded with message information instead of a buffer address and size and these codes may change for different protocol versions. The owner of the mailbox will fill in the appropriate fields and then set the valid flag, the target of the message will save the data before clearing the valid flag.

Description of Elements of the Table function code: Located preferably at byte 00, the function code basically tells what kind of message this is. It depends on the direction (Host to MIP or vice-versa) for interpretation. For example, if the request is to change mailbox locations, a function code identifying that function of the instant message will be in this byte. These codes from a current embodiment are in columns g and l of FIGS. 6 and 7, respectively.

MIP routing code: This identifies the kind of message. Specifically it indicates which process in the MIP or MIS will need to deal with the message so that the front end process within the MIP can direct the message for appropriate response.

host routing code: This performs the same function for the Host processor entity. It identifies the kind of message and where within the message handling system of the Host the message should be directed to. Thus, in a Host to MIP message, the Host routing code will be sent back to the front end message receiving processor and from there be directed to the process within the host needing to get the reply. In a MIP to Host message, the MIP routing code will perform this function and the Host routing code will just be rewritten for the Host. While this kind of routing protocol may be found in communications systems, it is heretofore unknown in the context of controlling the run-time operating environment of a multiprocessor computer system.

code modifiers: These are flags which designate specific attributes of the class/function code.

bit 7: If set, this is a MIP to Host message; if clear, it is a Host to MIP message.

bit 6: If set, this indicates that there is a buffer address/size indicator in the message, otherwise the message space usable for other purposes (codes) if needed. (NOTE: if the buffer bit is set in the request, indicating a buffer will be used for the request, and there is no buffer for the response, the buffer bit will preferably be clear in the response.)

if MIP→Host message) and it is returned in the response mailbox. The requestor must guarantee that the sequence number is different and increasing for each message initiated from the requester (even if there are multiple users of the requester, such as when more than one processor in a Sub-POD may be sending requests). The sequence number is allowed to wrap back to zero. If the requestor is the MIP a different sequence will be kept for each mailbox user. The sequence numbers used by the requesters (host or MIP) can overlap, coordination of the sequence numbers for messages that are initiated in the separate directions is not required.

buffer address: This is the address of a buffer of information that is an extension to the information in the mailbox. All buffers are allocated by the host in host memory. The buffer address in the preferred embodiment is always in bytes 08 through 0f.

buffer size: This is the size in bytes of the buffer whose address is specified in the buffer address field (Bytes 10 through 13). This field may also be used for other data if bit 6 of the code modifier field is clear.

valid flag: Two values are currently used. 0=contents not valid; 1=contents valid; values 2-ff are reserved for future use. In preferred embodiments the receiver (host or MIP) of a message is enabled to write over the valid flag area of the mailbox in which it receives a message in order to let the sender know the message was received by the receiver.

The rest of the mailbox, if used, is function dependent.

TABLE 2

RESPONSE mailbox format.

| 7 | 6 | 5 | 4 | 3 | 2 | 1 | 0 | byte |
|---|---|---|---|---|---|---|---|---|
| valid flag | status | | | | | | | 3f - 38 |
| | | | | | | | | 37 - 30 |
| | | | | | | | | 2f - 28 |
| | | | | | | | | 27 - 20 |
| | | | | | | | | 1f - 18 |
| buffer size (if code modifier bit 6 is set) | | | | | | | | 17 - 10 |
| buffer address (if code modifier bit 6 is set) | | | | | | | | 0f - 08 |
| sequence number | | | | code modifiers | MIP routing code | host routing code | function code | 07 - 00 | function code: SAME EXPLANATION AS REQUEST
MIP routing code: SAME EXPLANATION AS REQUEST copied from sender if this is a Host → MIP message.
host routing code: SAME EXPLANATION AS REQUEST copied from sender if this is a MIP → Host message.
code modifiers: SAME EXPLANATION AS REQUEST
sequence number: copied from request mailbox
buffer address: SAME EXPLANATION AS REQUEST
buffer size: SAME EXPLANATION AS REQUEST
status: result of the request determined by recipient
valid flag: SAME EXPLANATION AS REQUEST Other bits in the code modifiers are useable as desired for improvements/modifications.

sequence number: This is an identifier written by the requestor (the host if Host→MIP message, or the MIP Certain features of this message pair format are needed for a smoothly operational protocol. In the request and response messages in a Host to MIP message, the MIP routing code should be specified. Since the MIP will copy the host routing code from the request message to the response message host routing code field, the host should use this routing code for routing the response message. Thus, the host can use any routing code in the request message since it will be copied into the response message.

In the MIP to Host message, the host routing code should be specified. Also, the host will copy the MIP routing code from the request message to the response message MIP routing code field. Therefore the MIP can use any routing code in a request message.

The routing codes in the preferred embodiment for these messages are as follows:

Briefly review table 3 below in which the routing codes for a preferred embodiment are specified. If in a Host→MIP message the host specifies "3" as the MIP routing code value, it is saying that the Mailbox Handler routines in the IMS/MIP software will be called upon to handle the message's request, in this example, perhaps changing a mailbox address. In the Host system, the handling process would likely be a "7" since this is a communications control message, but since hosts particularly should be able to evolve, the Host should have flexibility in what process it uses as a process to respond.

TABLE 3

Routing Code Summary

| | Description |
|---|---|
| MIP Routing Code$_{16}$ | |
| 0 | Not used |
| 1 | Platform Messages |
| 2 | Architectural Messages |
| 3 | Mailbox Handler Messages |
| 4 | Shared Memory Control Messages |
| Host Routing Code$_{16}$ | |
| 0 | Generic Message |
| 1 | BIOS Messages |
| 2 | HAL (Hardware Abstraction Layer)/PSM (Unisys equivalent of HAL) Control Messages |
| 3 | Processor Messages |
| 4 | I/O Messages |
| 5 | Exclusive Memory Messages |
| 6 | Shared Memory Messages |
| 7 | MIP/Host Communications Control Messages |
| 8 | Partition Data Messages |
| 9 | Partition Control Messages |
| A | General Logging Messages |

A specific starting mailbox location is always the same for the Boot Strap Processor (BSP) that is, the processor which is responsible for starting itself and its POD or Sub-POD when released out of reset by the MIP, The BIOS for the BSP will identify this location for each Sub-POD.

The multiprocessor computer system with Intel processors uses a single mailbox pair during normal operation. Once the master BSP Sub-POD has been selected, a single partition mailbox pair is selected by the BIOS for use by both the BIOS and the Host OS. (The BIOS selection will be translated for the partition by the address translation hardware for the partition that is organized/programmed when the partition is first set up.)

For Intel processor platforms, the MIP is functions like a single device in communication with the BIOS, initially; and after booting, with the Host OS having a single mailbox location.

The partition mailbox pair also contains two mailboxes; one for host to MIP and one for MIP to host communication. During the boot the MIP is unable to generate interrupts for responses on host to MIP communication because the interrupt organization (APIC) is set during the boot procedure. During the initialization and boot sequence, the hardware is in "Virtual Wire" mode and interrupts from the MIP cannot be generated. Therefore, until the switch of a host to APIC mode, the BIOS and OS loader have to poll the MIP to Host mailbox to determine when the MIP has presented a response to any request from the Host to MIP message.

The structure of the data in a partition mailbox pair is preferably the same as in the BSP mailboxes.

The initial location of the partition mailbox pair in the preferred embodiment is 0xF000 in the Host memory unit or MEM. (The "0x" in this address means that it is a hexadecimal number, as opposed to decimal, octal, binary, etc). We order the host to MIP mailbox as the first mailbox (cache line) of the pair—the host to MIP mailbox is at address 0xF000, the MIP to host mailbox is at address 0xF040. Once the BIOS has done appropriate initialization, the partition mailbox pair will be moved to a more secure area. The mailbox pairs need not be in contiguous memory locations or in order, but we find this organization easier to track.

Figure 6:
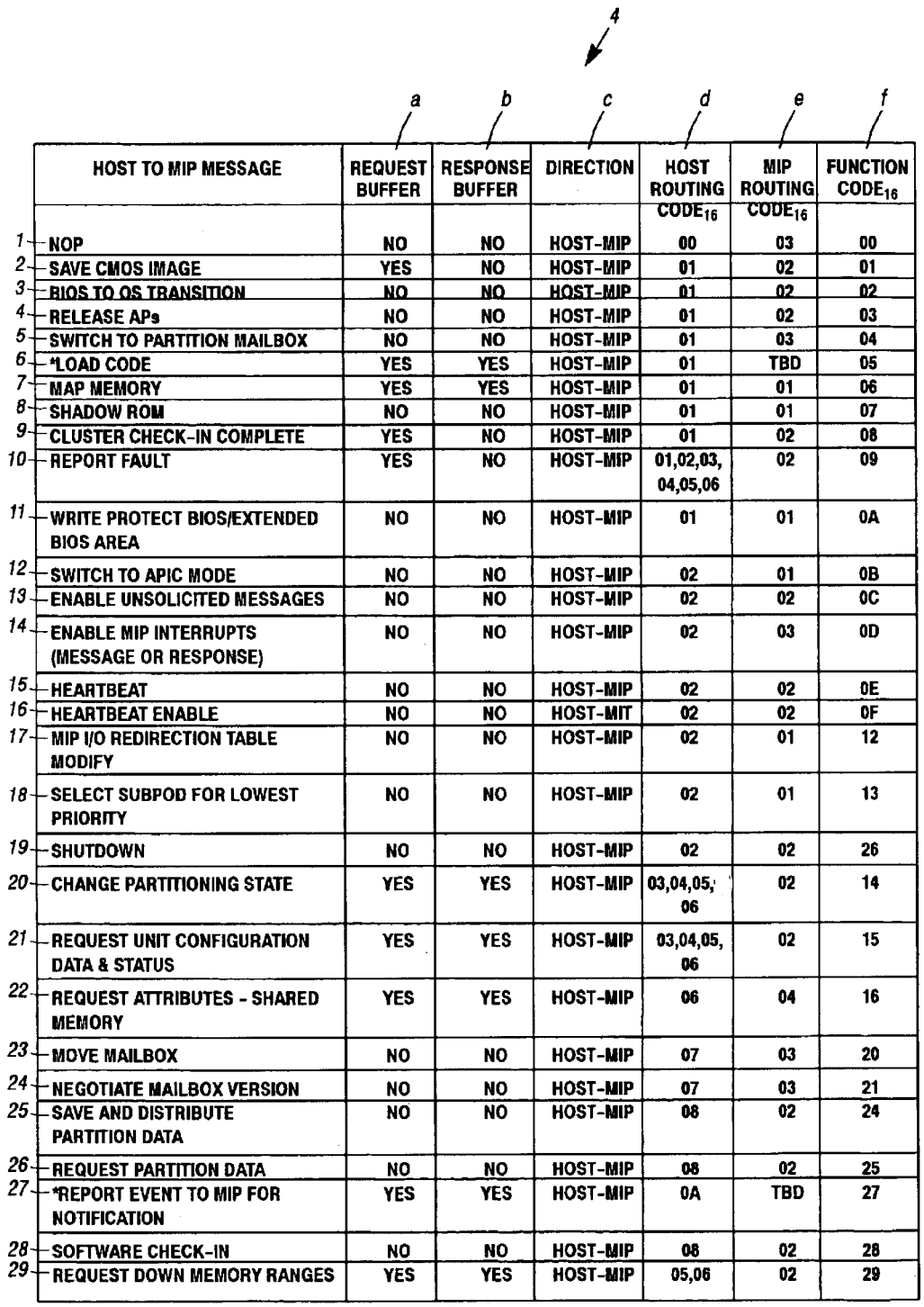
FIGS. 6 and 7 are tables of messages for use in preferred embodiments of the protocol of this invention.
Figure 7:

The particulars of the preferred embodiment protocol includes the messages listed in the table reproduced as FIGS. 6 and 7.

Table 4 in FIG. 6 identifies the names of the preferred embodiment host to MIP messages in the first column, identifies whether there is a request buffer and a response buffer in the second or third columns and identifies the routing codes and function codes in the last three (3) columns. The direction column merely indicates that these are all hosts to MIP messages.

As may be clear by now, messages in this system are routed in pairs (one MIP to host/one host to MIP, or vice-versa) for each message pair. Accordingly, the description of the messages begins with a request form and then the response form is described.

The first message illustrated NOP, is an abbreviation for "No Operation" and is preferably used to test the host to MIP communication channel. It uses the format of the REQUEST mailbox from Table 1 above. In the code modifiers the REQUEST has Bit7 Clear (byte 03) indicating it is a host to MIP message and Bit6 Clear (byte 03) indicating that there is no buffer. The RESPONSE message in reply from the MIP to the host will also indicate in the code modifier Bit7 Clear (byte 03) that this is a host to MIP message response. In other words, Bit7 will simply be recopied back in the response. Bit6 also will receive the same treatment since there is no buffer being re-sent with the response message. In none of the host to MIP messages will this copy back of bits 6 and 7 of byte 03 need to change. As will become abundantly clear when reference is made to FIG. 5 in the discussion later, separate mail box addresses for the messages from the MIP to the host or the host to the MIP are provided in each mail box pair so the participants in the protocol cannot get confused about which message it is sending or receiving.

In the second host to MIP message identified in Table 4, an organizational procedure enhancing the efficiency of the multiprocessor system is identified. This function "Save CMOS Image" 2 is used by the BIOS at the end of the boot sequence, prior to the hand-off to the operating system loader, to pass a copy of the current contents of the processor associated CMOS to the MIP software for storage. By storing the basic information on the configuration of the resources for a particular processor in an area accessible to the MIP, the MIP will have more ability to manage the multiprocessor system. In the request to save CMOS Image message, the bytes 0F to 08 will contain the address of the buffer to save, and the number of bytes in the buffer will be contained in the bytes 13 to 10. Note that the request buffer in FIG. 4, line 2, is marked "yes" since some of the buffer space of the messages used and the response buffer marked "no". In the preferred embodiment this only means that the No Buffer Bit 6 of the code modifiers is clear indicating that there is no buffer of use in this returned response message. This would be the case whether the status is successful or failed in the response from the MIP to the host.

In Instruction 3, the multiprocessor processing unit running the BIOS notifies the MIP software that the read of the boot sector has been successful and that the BIOS is about to turn control over to the operating system loader software. This instruction is called BIOS to OS Transition. No buffer is needed in the response and the only piece of information required is that the MIP has received the message and this can be accomplished in the status bytes. In the preferred embodiment marking them as zero equals received.

The fourth message to Release the Application Processors "Release APs" is used by the BIOS to inform the MIP software that all these Sub-PODs that are up in the partition and are not the master Sub-PODs should be switched to APs. The MIP will issue a become AP message in the mailbox of all non-master BSP Sub-PODs.

This is an example of a cooperative control function. In other words, the processors in a partition organize themselves and based on the results of that organization reported to the MIP, the MIP issues the become AP messages and become BSP messages appropriately. These messages will be discussed in further detail with reference to Table 5 in FIG. 6. The Release APs message again requires no buffer and only an indication that it is a host to MIP message. The response merely needs to indicate that it has been received in the status fields.

Another function provided by the protocol is the message in line 5 "Switch to Partition Mailbox". On successful completion of this message pair, the partition mailbox will be used and all the other mailbox pairs previously in use will no longer be used. This function is only used by the host BIOS to select the mailbox for the BIOS and the operating system loader. In order to accomplish it the BIOS should be programmed to perform a test of the partition mailbox pair location it plans to use. It should zero out the partition mailbox pair locations. It should then issue the "Switch to Partition Mailbox" message. However, there should be no outstanding message requests when this message is issued. In the preferred the embodiment the BIOS cannot send any additional messages on any mailbox until the switch to partition mailbox message is complete either successfully or unsuccessfully. The MIP software will then test the partition mailbox pair location and if its test is successful the MIP will send a "good" status in a response message through the mailbox pair in which the request was made. Then the partition mailbox will be used for all subsequent communications between this host and the MIP. If the test is unsuccessful the MIP will send a "bad" status response message and subsequent messages will proceed through the original mailbox pair. This message request by the host to the MIP will require an address of the new host to MIP mailbox referenced by the buffer as well as an address of the new MIP to host mailbox memory location. Accordingly, bit 6 of the code modifier byte would be sent and the buffer address and size information included in the request message. The response message will only require a status indication of whether the MIP has tested the location successfully or failed.

The sixth message pair is called "Load Code". This message function can be used by the BIOS to load parts of itself that were not included in the initial load image if desired. The address of the buffer and length of the buffer at which this additional BIOS maybe located is carried in the request message. The response message requires a change in the status area to indicate whether this is an acceptable change to the MIP or not. The RESPONSE should also contain a buffer address and size to show where to get the additional code.

The "Map Memory" message 7 enables the passing of the DIB (that is, the Direct I/O Bridge, a module for connecting to I/O peripherals) configuration information to the MIP software to perform initialization of range registers in the Sub-PODs in order to setup the appropriate addresses of the I/O available through the DIB. The request message of course has the address of the buffer and the number of bytes in the buffer if a buffer is used. In the preferred embodiment a fixed configuration of codes will be expected in the buffer itself, saving space that might otherwise be used to identify its parts. The response message sent in reply may in addition to the status, contain a buffer address. This buffer passing will enable the MIP software (the IMS) to allocate ranges in the MSU global address space for each partition. The MIP will give out such address information as each partition needs to know through this process. In preferred embodiments, the MIP software will identify several regions in the memory space for the partition it is communicating with, and identifying any regions that may be shared with other partitions if any. The Host will pass through its buffer, the information on which addresses it has assigned for various resources including interrupts, I/O, out of range addresses and the like. The MIP will send back in the response message the region addresses and sizes allocated to this partition, and the states of these regions, whether they are shared or exclusive to this partition and the like.

The "Shadow ROM" message 8 is used to change the read/write access to the four Shadow memory spaces by the BIOS to write protect the Shadowed ROM. (Providing a place to put the slow ROM information is not new, but it has not previously been done in a unassigned multiprocessor computer system, such as is provided under current Intel-based multiprocessor systems. Shadow ROM is defined as is commonly known in the industry. In the code modifiers in the request for this message, it should be indicating that there is no buffer, however, byte 08-0C will contain information regarding the number of areas that are to be changed in state and the state changes to be made in those areas in the preferred embodiment. (Thus bit 6 of byte 03 will be clear.) The response message merely needs to indicate whether the change has been successful or whether the change has failed in the status fields.

The cluster check-in complete message in line 7 is used to notify the MIP software that the Sub-POD has completed its processor start-up and APIC interrupt system initialization. The data provided in the buffer in this message is the CPU-Identification Information along with the status. The status should indicate whether the processor identified is operational, whether the processor specified is "up" in the partition and not in use (waiting for a become AP message), whether the processor has failed the built-in self test, whether the processor specified as up in the BIOS configuration table has failed to respond, whether the processor specified as up in the partition but not in use has failed to respond, whether the CPU-Identification stepping ID, model ID, or family ID, did not match the CMOS configuration data, whether the BIOS has microcode for this particular processor or whether the processor is not available for some other reason including failure of the hardware or hard powered down disabled. Additional information including the APIC version, the logical APIC ID, the indicator of whether this is a BSP processor and the type of processor this processor is, can all be reported in the buffer space referenced by this message pair. In the status of the response message only a "received" status (or "not received") needs to be sent. Thus, with each of the host instruction processors reporting-in in this manner using the cluster check-in message, the MIP system is enabled to report out to a user of the MIP system the status of each POD, Sub-POD, and processor and its operational configuration within the computer system.

In keeping with the reporting theme, the message "Report Fault" 10, is used by the host processor to report fault information to the MIP. This can include fault information for hardware or software faults reported by the BIOS, the hardware abstraction layer (HAL), or PSM (Same function as HAL—Stands for (UnixWare) Platform Support Module.) or other host components. This message may have various routing codes. The host routing code is used by the host software to route the response to the message back to the intended recipients transparently to the MIP. The MIP response for this to work will in all cases echo the original host routing code. Thus, in the request message, byte 18 will be reserved to indicate the operating system type so that the messages can be properly interrupted. Degree of severity, probable cause of the problem and type of alarm, as well as other information relating to the problem or status can be transferred from a buffer area indicated by the buffer address in the message.

In the response message, the status choices should include indicators of "received", "internal error", or "failed".

Message 11 is a request to write-protect the BIOS or extend the BIOS area. This is provided to allow the BIOS to selectively read from DRAM in the MSU and write to ROM in the DIB. This may be used during the shadowing of the option ROMs to guarantee that the option ROMs do not corrupt the BIOS area. No buffer is transferred on the request message but one of the byte codes in the buffer area, in the preferred embodiment byte code 08 is reserved to indicate the BIOS state. The response message status will indicate whether this has been a successful change in BIOS state or whether it has failed.

The twelfth message, "Switch to APIC Mode" 12, is used by the operating system in the host partition to request the MIP software to switch the partition hardware from virtual wire mode to APIC mode. (APIC stands for Advanced Programmable Interrupt Controller and is an Intel function. The timing of the setup of the APIC controllers in the boot up sequence in a multiprocessor system in accord with the systems described herein as described in RA-5187, U.S. patent application Ser. No. 09/362,388, "Method and Apparatus for Initiating Execution of an Application Processor in a Clustered Multiprocessor System" and communications between APIC controllers of different Sub-PODS are discussed in RA-5262, U.S. patent application Ser. No. 09/362, 389, "Method and Apparatus for Routing Interrupts in a Clustered Multiprocessor System". Both of these applications are hereby incorporated by this reference in their entirety. The MIP does not generate interrupts to the host operating system until the "Enable MIP Interrupts" message is received. It is the host operating system responsibility to issue the "Switch to APIC Mode" message before the "Enable MIP Interrupts" message. No buffer is sent in the request in this message and the status is either "successful" or "failed" in the response message.

Message 13 "Enable Unsolicited Messages" is used by the host to inform the MIP software that the host software is ready to accept unsolicited messages from the management system software. Once enabled, the host cannot disable unsolicited messages. This message does not enable MIP interrupts, just unsolicited messages. Again, in the request no buffer is required and in the response the only status indicator needed is a "received".

Message 14 of the host to IP messages, does enable MIP interrupts. It's called "Enable MIP Interrupts". This function is used by the host to inform the MIP software that the host software is ready to accept interrupts from the management system software run by the MIP. Once enabled these cannot be disabled. The response message by the MIP will have a received in the status area but it will also, preferably, issue a confirmatory interrupt at the same time.

The next messages "Heartbeat" and "Heartbeat Enable" is actually a pair of paired messages. The Heartbeat message 15 will be issued at predefined intervals by the host software to the MIP software to merely validate that the host is operational. If the MIP does not receive this message in a predefined interval the MIP software may initiate an automatic reboot if other partition state information indicates that this partition is not operating. In the request message in a Heartbeat message pair, the Heartbeat's source should be identified and in the preferred embodiment two bytes are reserved for this in the buffer address area. A response by the MIP indicating that the Heartbeat request has been "received" or "not received" is preferred. In the Heartbeat Enable message 16, the host software will be telling the MIP to enable the Heartbeat, in other words, to look for the Heartbeat message and start a timer mechanism. This message should specify to the MIP the Heartbeat interval. In the preferred embodiment request, both the interval and the Heartbeat source information will be included in the buffer address area of the request message. The reply by the MIP will include in the response message status area either that it has been "received" and thus indicate that the MIP will start timing or that it has "not" been "received" indicating that there is some failure in the MIP software or some inability to accomplish the Heartbeat monitoring function. Each Heartbeat request should increment the value in the sequence number byte fields, 04–07.

Message 17 "MIP I/O Redirection Table-Modify" is used by the host to request a change to the redirection table information. In this protocol the I/O redirection table entry for the MIP can only be written by the MIP, it is a dynamic string that is only MIP accessible. This table entry for the MIP specifies the interrupt delivery mechanism for MIP interrupts. On receipt of this Message 17, the MIP software is expected to write the I/O redirection table information in all DIBs in the partition through the MIP_INT dynamic string.

The host will use this message request 17 to request a change to the redirection table information including destination ID, destination EID, delivery mode, and interrupt vector. The bytes in the request message 08—0b, will contain the delivery mode interrupt vector destination EID and destination ID information currently used by this host processor partition. Since the MIP software will be writing the I/O redirection table information through a different communications channel (this is the MIP_INT dynamic string), the response message is simple, it is either successful or it has failed for some reason and the failure mode may be indicated in the status bytes of the response message.

Message 18 "Select Sub-POD for Lowest Priority" is provided to allow the host to change the Sub-POD mapping.

When this message is received all the DIBs in the partition will be set to the same value. This is a way to let the Intel APIC system function in a multiprocessor environment. Thus, where a processor in a Sub-POD has been selected to handle the undirected interrupts (called lowest priority interrupts in the Intel APIC system) for the partition, all the DIBs in this partition will generate service requests at the lowest priority value for this Sub-POD processor.

This message pair is relevant for handling interrupts within a Sub-POD. For I/O interrupts there is a APIC mode called lowest priority mode and in this mode the interrupt is sent to a group of processors and the processor with the lower priority claims and handles the interrupt. In multiprocessor systems using the inventive protocol, there is no method for all processors in a partition to make the lowest priority decision, instead it must be done on a Sub-POD basis. The DIB (Direct I/O Bridge) should have a register to allow the selection of the Sub-POD for lowest priority interrupts based on the lower 3 bits of the interrupt vector. For first deliveries, this register will be initialized such that Sub-POD selection is rotated for each vector number. This means vector 0 will go to the lowest Sub-POD in the partition, vector 1 will go to the next Sub-POD, and so forth, rotating to the lowest until all 8 vectors have a value. Thus, in the request message, bytes 0f–08 represent the values for the vectors for each Sub-POD of the 8 Sub-PODs, vector 0 indicating the Sub-POD identifier with the lowest priority through vector 7 indicating the Sub-POD with the highest priority. Thus the lower 3 bits of the interrupt vector which are 0 would be directed to the lowest priority processor on Sub-POD identified with vector 0 in byte 08. The lower 3 bits of the vector being 7, would be directed to the lowest priority processor in the Sub-POD identified in bit 0f. The response again may indicate merely whether the operation was successful or if it has failed and the failure mode if any is desired to be indicated.

Message 19 "Shutdown". The BIOS or host OS may desire to shutdown its partition thus request the MIP to perform a shutdown of the partition. Preferably there are two options, shutdown with automatic reboot, and shutdown with a halt. If an automatic reboot is preferred the MIP will automatically reboot this partition, if a halt, the MIP will halt all units in the partition. The host should not issue such a command unless the partition is in a reboot or halt state if possible.

On auto recovery it is preferred that as a part of the auto recovery sequence the L2 caches of the processors are flushed prior to reset and the management system will perform return of all the data in the partition back to the MSU which includes the L2 cache in all processors prior to initiating a reboot. In this way the MSU will have ownership of all the data for the partition. This return of L2 caches will be performed regardless of whether the shutdown is with a halt or a reboot.

If shutdown and halt is selected and sharing had been enabled for the partition, the management system will need to clear the sharing information for this partition and all the other partition's agent tables that may have participated in the sharing. By enabling this message pair, this protocol allows for smooth shut down procedures for each partition.

In the preferred embodiment, 2 bytes in the request message are reserved for the reboot selection, although a single bit could be used. The response message should provide an indication that the request was received.

Message 20, "Change Partitioning State", is issued by the host to the MIP in order to dynamically change the partitioning state of the host unit. This can be initiated due to a host user interface command, a fault, a workload management software request, or can be issued after the MIP has issued a "Request Partitioning Change" message to the host. For this message, a buffer is included. The buffer is used by the MIP to return specialized data to the host for the unit specified in the request message.

For multiprocessor system where more than one type of processor may be used, the response data for bringing up a processor must contain the processor type information from the EEPROM including stepping, model, and family. It also should include the application processor (AP) instance number within the system or other identifier if any, and the start-up address for each processor. This information will also be provided by the BIOS in the multiprocessor table after the reset sequence is complete. It is provided in the response to this message in the event that the host software cannot access the multiprocessor table when a dynamic "up" is performed. The response data for the "up" of the memory unit contains the starting address and length of the memory area and includes the number of down memory ranges for the memory unit. We only need the number and not their address because there is another message for the host to request the addresses (Request Down Memory Ranges) that moves this particular conversation along. This number, if non-zero, tells the host that it should issue the Request Down Memory Ranges message. "Request a Unit Configuration Data and Status", message 21 is used by the host to obtain the configuration data and Identifier of a specific unit. (Identifier here means the specific Intel OS type and the instance number for that particular type of unit. Non-Intel processor types could use names.) We mean by "units" here, all visible unit types that are members of the partition. This includes in our preferred embodiments, MSU's (or most preferably MEMs which are memory units that are identifiable not by hardware but as part of a particular partition, such that the MEM is the host visible memory unit or all the memory that host partition sees), IP's, PCI Bridges, PCI Buses, and CPB's (which are hardware boards to make the hardware conform to the PC specifications expected by the boot processors), all units of specific type, or all units that are members of the partition.) The partitioning state of the unit or units being inquired about will be sent too, that is, the state this host thinks this unit is in, up/down (or other state if a system has some intermediate states that are tracked. The preferred embodiment uses just up or down).

The response message will have a format for the buffer for all units that are not "up" and will confirm they exist and may be available to the host partition at a future time. In the preferred embodiments the response message has a particular format for UP MEMs and UP Processors For other unit types (PCI Bridges, etc.) that are UP, and for all units that are DOWN, a generic "additional unit entry format" is returned. This can confirm that these units are members of the partition and could therefore be Upped into the partition by the host OS through a Change Partitioning State message if desired.

The response message will have different formats for the buffers for all UP units unique to the unit type. Processors in up states have different information of relevance than memory or other additional units and the format will support that information by the organization of the format of the buffer. In the response message itself, the address and size of the buffer with the information will be generated by the MIP/IMS system along with the unit type and instance number generated by the host in the originating request message. In the status area of the response message, if the process will not be successful, the MIP can indicate that the unit is of an unknown type or instance number, that there is a buffer overflow error or an internal problem with the IMS software making the response unavailable.

Message 22 is a request for the attributes of shared memory ("Request Attributes—Shared Memory". In the preferred embodiment systems, the MIP/IMS system keeps track of the attributes of all shared memory and provides the user interface to change these values. The host will be notified by a MIP to Host message of a change in the shared memory attributes. (See discussion of M7, FIG. 7 below for that MIP to Host message.). Here also, the unit type and instance number should be included in the request message. The buffer is used by the response message to specify the attribute values in the preferred embodiment. The length of the buffer, if zero, indicates no attribute values will be passed to the host partition and the buffer is thus not accessed by the MIP. If there was a status field value in the response indicating a buffer overflow error, this length of the buffer field will contain the buffer length required to cover the overflow.

To clarify this message's process, note that the Host is providing an empty buffer. The MIP then puts the current attribute values into the buffer and passes the buffer back to the Host. The MIP cannot acquire a memory buffer in the Host's address space in the MEM which is why the Host provides the empty buffer. If the buffer is too small the overflow status tells the Host to issue a larger buffer for this conversation.

The "Move Mailbox" message 23, is used to move the mailbox pair from its current location to a new location specified by the host. The response is sent to the old mailbox. If the response indicates that the MIP was not successful the new mailbox will not be used.

The preferred algorithm for employing the moved mailbox function has six (6) steps: 1) the host performs a test of the new mailbox pair locations; 2) the host zeros-out the new mailbox pair locations; 3) the move mailbox message, identifying that it wants to do this in its function code, is sent by the host via the old mailbox location; 4) MIP software tests the new mailbox pair location; 5) if the test is successful the MIP sends a good status response message through the old mailbox and switches itself to use the new mailbox for all subsequent message communications; and 6) if the test is unsuccessful, the MIP sends a bad status response and the old mailbox is used for subsequent messages. In the request message, the address of the new MIP to host and new host to MIP mailbox are both loaded.

The "Negotiate Mailbox Version" message 24 is used by the host to negotiate a version level for the host to MIP communications. The host will provide the minimum and maximum version level that it's software supports. The MIP software will respond with the version that it has chosen from the range specified. The host entity must be sure that all messages it has issued have been completed before issuing a negotiate mailbox version message. Prior to receiving a negotiate mailbox version message the MIP will use the lowest mailbox version level supported. It is preferred that the first message issued by the BIOS for Intel processor based servers is the negotiate mailbox version message. No buffer is required for the request message, merely an indication of the maximum version and minimum version. This can be accomplished in a few reserved bytes. The response message should indicate first whether it has been successful, and second what the preferred or selected version that the MIP will use is.

"Save and Distribute Partition Data" is a message used by the host software to distribute data to other running partitions via the MIP. This will also have the MIP save away partition specific data for later retrieval. This partition specific data will be sent to all running partitions by the MIP including the original partition that has previously issued "save and distribute partition data" message. The partition data is sent to the host using the "partition data notification" MIP to host message. The partition specific data for a partition can be requested using the "request partition data" MIP to host message. The data saved and distributed is host dependent and kept track of by the MIP software. A message type field is used in the request message to allow the host software to save and distribute multiple different messages. Each time the save and distribute partition data message is received by the MIP the partition specific data is distributed and saved. Only the last copy of the partition specific data for each message type is saved by the MIP. When the host OS stops, all messages saved by the MIP for that partition are deleted. The OS type is also saved by the MIP as part of the specific data for the partition. Thus, the OS type, message type, and the partition specific data should all be included in the request message. Currently, the OS type may be either Windows NT, UnixWare, A-Series MCP or OS2200, although others could be used in the future. The response message merely needs to indicate that it has been received or that there may have been a failure in the status area.

When the host software wishes to request the saved partition data, accomplished by the previous message by the MIP, it employs the "request partition data" message 26. In the request message the partition data and message type needs to be included. The response will have the partition specific data, the OS type, the partition status, the partition ID, and the message type information all included. It will also indicate that the request was received or that it is failed either because of an internal error, and unknown partition ID, or an unknown message type.

Message 27 "Report Event to MIP for Notification" is used by the host OS to report event information. This can include OS type and version, software critical events including workload information, I/O events, etc. Notification could include electronic service requests, stability or performance data, remote support requests, customer alerts, and so forth, which can be initiated by the MIP/IMS system monitoring the host. Thus if a piece of the host is failing or in trouble, a request can be automatically routed through the MIP indicating that service is required.

The request message would include a buffer address in the preferred embodiment and the reply would indicate receipt. The buffer format would have areas reserved for unit type, instance number, nature of fault or request and the like. The response would need to indicate successful receipt of the message and the buffer, if any was sent.

"Software Check-in" message 28. This message is used by the host software to let the MIP/IMS system know that the host software is up and running. When received by the MIP, the MIP will indicate that the partition is running on its monitoring function software in preferred embodiments. All check-in messages with their accompanying partitions specific data are logged in the MIP log. The OS type partition specific data and message type information should be included in this request message. The response merely needs to indicate that it has been received or if there has been a failure in the status area of the response message.

"Request Down Memory Ranges" message 29, is used by the host to obtain all the inoperative memory ranges (i.e., down memory ranges) for a specific memory unit in the "up" partitioning state.

The request message must contain the instance number, the unit type, and the number of bytes in the buffer and address of the buffer to which the information should be written by the MIP. The response will repeat all this information and include the starting address and length of all the down memory ranges. The response also indicates whether it has been successful or failed in the transfer of this information and the nature of the failure if desired.

Message 30 "Additional Proposed Host to MIP Software (MAP) Functions", may be designed as desired. These may include a performance monitor data collection and coordination message pair and unattended operation including power scheduling message pairs among other useful functional messages.

Thus, it can be seen that with additional functions addressable through particular versions, the protocol is extensible and quite flexible.

The MIP to host messaging functions are not as extensive in this protocol system. The first message, "Become AP" has been mentioned before. It is used by the MIP software during the boot sequence to convert the BSP on all non-master BSP Sub-PODs to APs, when the MIP has already received a "release APs" message from the host. This message will be directed to each non-master Sub-POD BSP check-in mailbox. When the request message is received, the BIOS changes the BSP on the Sub-POD to an AP as may be required by the particular processor. The response from the BIOS executing on the BSP for that Sub-POD should indicate whether this has been successful or failed.

Message M2, "Become BSP" directs the master BSP Sub-POD that is the BSP for the partition to remain one. When this message is received, the BIOS resumes the boot of the partition using the BSP on the designated master BSP Sub-POD. In the request message a processor map area is reserved. This processor map will inform the BSP which instruction processors within its partition are up. The response from the host merely needs to indicate whether the message has been successful or failed.

Message M3 "Orderly Halt" is used by the MIP to request the host OS to shutdown. When complete the host OS will issue the shutdown Host to MIP message with the appropriate reboot selection. The request message for an orderly halt will include a reboot selection.

The response message merely needs to indicate receipt.

Message M4 "IMS Available" will indicate to the host that the MIP is available for Host to MIP communications after a fail over to a backup MIP or a reboot of the MIP. The MIP software will issue this message to all running partitions.

No special information is required in the request and only a indication of receipt in the status area of the response is needed.

"Request Partitioning Change" message M5 is used for dynamic partitioning. The host will respond with a "change partitioning state" message if the partitioning state change can be made. The host routing code for this message is dependent on the unit type which is specified in the request message. The host routing code will thus depend on the unit type that is being affected by the partitioning. The host will account for changes to its processors, memory and I/O differently so it will be useful to have a different routing code for the affected unit types. Accordingly the MIP should order the partitioning requests so that partitioning can be done safely, since in the preferred embodiment only one instance of one unit type can be subject to this messaging at a time. The response message should indicate that the request message was received and whether the request can be accommodated, whether it is for an unknown unit type or instance, whether the partitioning state requested is unknown or if there is another host software error causing failure.

"Down Memory Range Notification" message M6. Using this message the MIP can inform the host of new failing memory ranges in a memory unit. The MIP provides the logical memory addresses utilized by the processors through their address translation hardware not the physical memory address. Different addresses may in fact be provided for each partition which shares a single shared memory range due to the starting addresses of the shared memory for the partitions.

The request message should indicate the number of bytes in the down memory range and the starting address of the down memory range. The Intel OS type and the instance number should also be indicated in the request message. The status area should indicate whether the request was received or whether it is failed and the reasons for the failure if known in the response message.

Message M7 "Host Notification-Shared Memory" will notify the host of a shared memory command or of a change in the values of the shared memory attributes. The host is expected to request the attribute values using the "Request Attributes-Shared Memory" host to MIP mailbox message 22. In the request by the MIP, the notification type, the unit type, and the instance number should be included in the request message. Dump, shutdown, and attribute change, as well as any other kind of indication of what change should be occurring in the shared memory area, can be included in the notification type area of the request message. The response, of course, should indicate whether the request was successful, failed, and why it may have failed if possible. After the reply is sent and has been received, the host system, if the request was successful, should send a Request Attributes-Shared Memory message 22 (from FIG. 6), to continue the conversation and allow itself to comply with the MIP notification of changes.

Message M8 "Notification of Configuration Change" is sent by the MIP software when a component is added or removed from the configuration for this partition. The request message should contain a list of the Intel OS types that have been added or removed. The host issues the request unit configuration data and status message 21 to the MIP when it receives this Notification of Configuration Change message M8 from the MIP. The MIP returns the unit information for the requested components. Along with the unit types in the request message, a count of the number of unit types listed should be included. Again, the response message should indicate that it has received the request and whether it has failed, and if so for what reason.

Message M9 "Partition Data Notification" is used to distribute partition data to all the partitions that have sent a "Save and Distribute Partition Data" message 25 and are 30 still up and running. A report fault or shutdown message from the host for catastrophic failure may be interpreted by the MIP as a reason for not distributing a partition data notification message to a host partition. In the message request partition specific data, OS type, partition status, partition ID, and message type should all be included. Again, there are five (5) message types currently available, although more may be available in the future including unknown, Windows NT, UnixWare, A-Series MCP, and OS 2200. The response message merely needs to indicate receipt or failure.

Message M10 "Report Fault" is used to report hardware faults from the MIP to the host. The data format in the request message will indicated the type of fault and the response merely needs to indicate receipt.

Part 3. Preferred Operation of the Protocol in the System.

Figure 5:
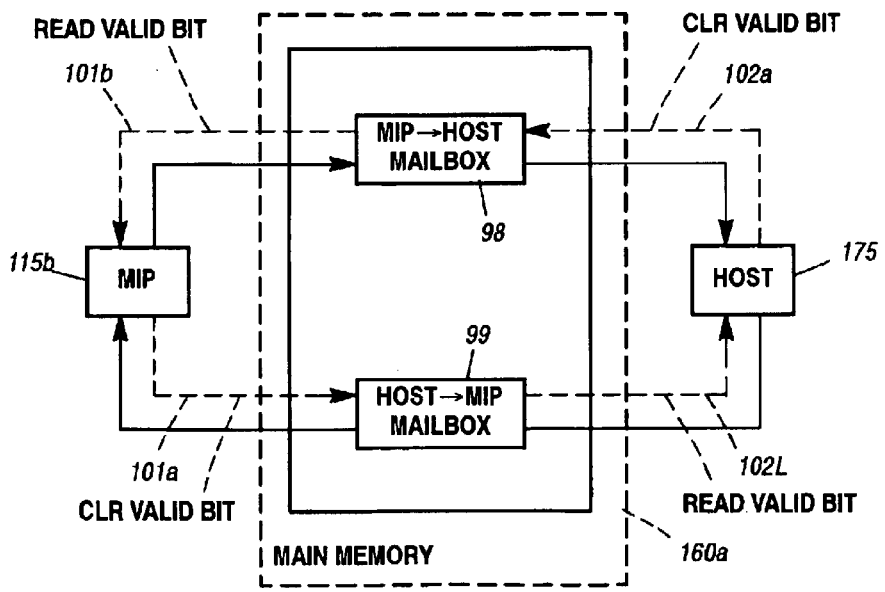
FIG. 5 is a simplified block diagram of the elements of a mailbox system for use with this invention.

The mailbox system. Refer now to FIG. 5 in which a main memory unit 160*a* is drawn in outline form. Within it, two (2) memory locations 98 and 99 are located which may be used a mailbox pair. A host processor 175 and a MIP processor 115*b* communicate with these mailbox pairs in a one-way process. Thus, MIP 115*b* can write a message to mailbox 98 employing any of the MIP to host mailbox messages available in the protocol, and the host 175 will be able to read the MIP to host message in mailbox 98, but not be able to write to it. Similarly, the host processor will be able to write a host to MIP message into mailbox 99, and the MIP processor 115*b* will be able to read this message but not be able to write to mailbox 99.

The operation of all of the mailbox systems described previously within this document function in this general manner as illustrated in FIG. 4.

Conversations. There are several types of conversations or dialogs that may be enacted using this protocol for control over the multiprocessor computer system to work.

There can be conversations related to the protocol itself, conversations related to resource management, and conversations related to reporting out states of the partitions and the overall computer system to provide appropriate maintenance and reconfiguration options.

All of these conversations proceed using elemental units of speech. These elemental units are the pairs of request/response messages described above, and any enhancements or additions to them. The conversations in this protocol take place through mailboxes, and always between a MIP and a host, not Host to Host. The message pair interpretation can be described by a short algorithm pair for each message pair.

Algorithms for message pair interpretation. In order for any protocol to work a simple a procedure is required. Please refer to FIGS. 8 and 9 in which this procedure is outlined.

Figure 8:
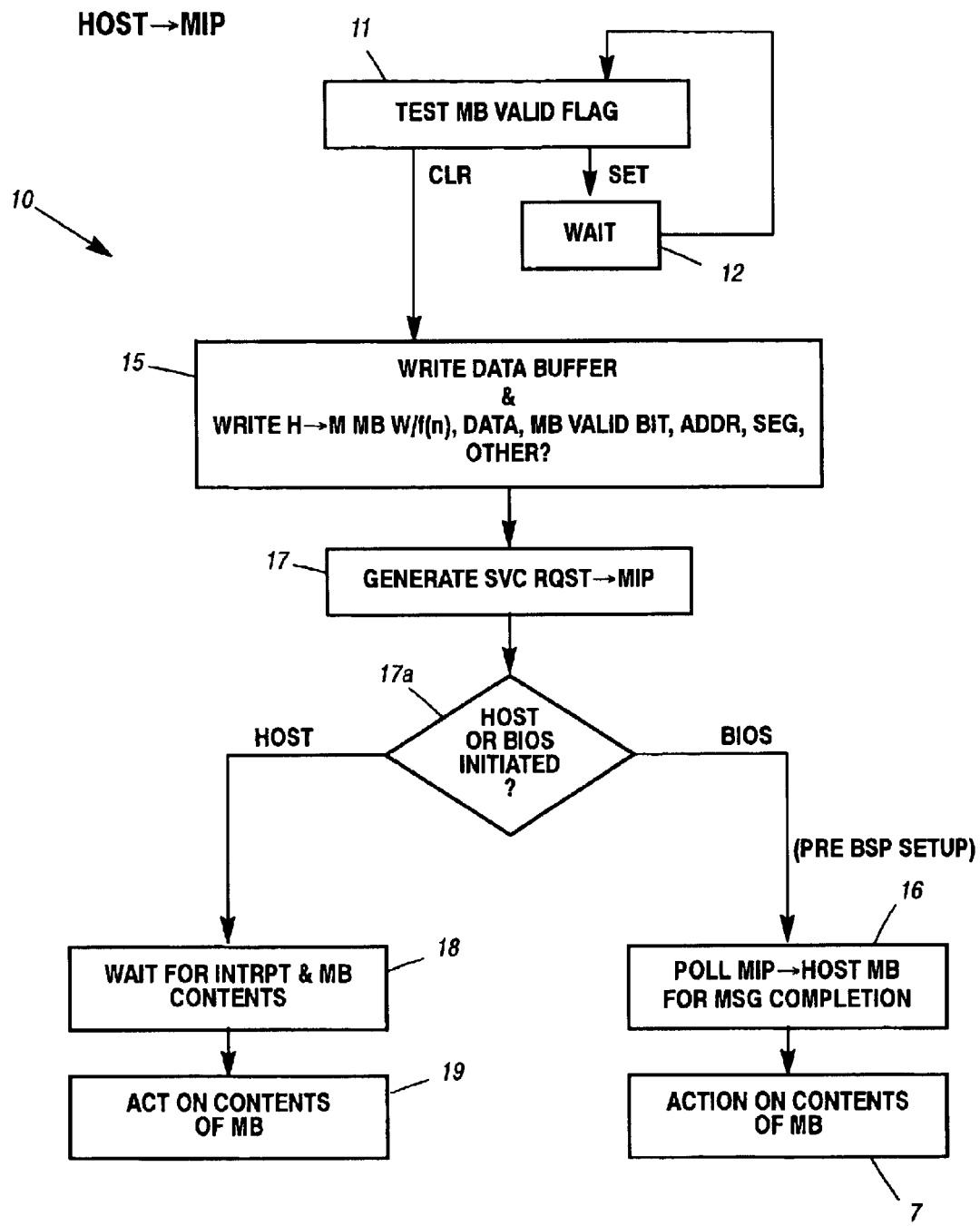
FIGS. 8 and 9 are block flow diagrams of how the Host to MIP and MIP to Host messages are passed through the mailboxes in the preferred embodiments of this invention.

In FIG. 8, the process 10 begins with the test of the mail box currently being used between the Host and the MIP that the Host has authority to write to for the messaging system being discussed. As mentioned this will be in an area of memory controlled by that host. Initially it may be a mailbox shared by numerous processors or it may be the one agreed upon between the MIP and this processor in the boot strap process. With reference to FIG. 5, the read valid bit line 102*b* functions to allow the host to read the valid bit from the Host→MIP mailbox (mailbox is referred to as "MB" in FIGS. 8 and 9), in order to assure itself that the values in the mailbox 99 are in fact valid. The MIP is allowed to write into this Host→MIP mailbox a valid indicator through line 101*a*, the clear valid bit line. In other systems one could clearly use an extra mailbox or some other communications means to signal whether data in a mailbox is valid between the two processors, but we have chosen to give each processor the ability to clear the valid bits of a mailbox it ordinarily reads, once the processor has read the contents supplied by the other. Likewise, when a new set of data is stuffed into a sending processors mailbox, it must wait for the clearing of the valid bit from the last time it stuffed the mailbox before it can know it is safe to communicate the next message.

Back to FIG. 8, once the Host finds the valid bit clear 11, it can then communicate with the MIP processor by executing the processes in step 15, that is, loading the data buffer (if one is used for this message) and then writing the message in the mailbox, with the function indicator, the data itself and/or the buffer address and length if required by the message type being used. Also, as the originator, the Host will in preferred embodiments set the sequence number data field as discussed previously. Any other relevant data that may be used in more advanced protocols would be set at this time too, by loading it into the Host→MIP mailbox.

In preferred embodiments, another channel is used to generate a service request to the MIP, to stimulate the MIP to look at the mailbox. In some systems this may not be needed if the MIP polls the mailboxes often enough for the needs of the system and its users.

As mentioned previously, the mailbox in question can be either a pre-complete boot mailbox or an after boot is complete mailbox. Although this need not be a step taken in the order shown here, step 17*a* may be part of step 17 or it could have taken place earlier. In any event, if the communication is before the boot strap process is complete and partition mailboxes set up, the action occurs via the Host polling the MIP→Host mailbox for a message indicating completion of the action requested by the Host. If after boot is complete, the interrupt system would be set up and the partition mailbox in use so there would be the ability to rely on the interrupt system to avoid continually looking at the MIP→Host mailbox for message completion, as is indicated in step 18. In both paths, the Host after completion of either steps 16 or 18 will act on the contents of the mailbox (7 or 19) to complete or move to the next step in the dialog.

Figure 9:
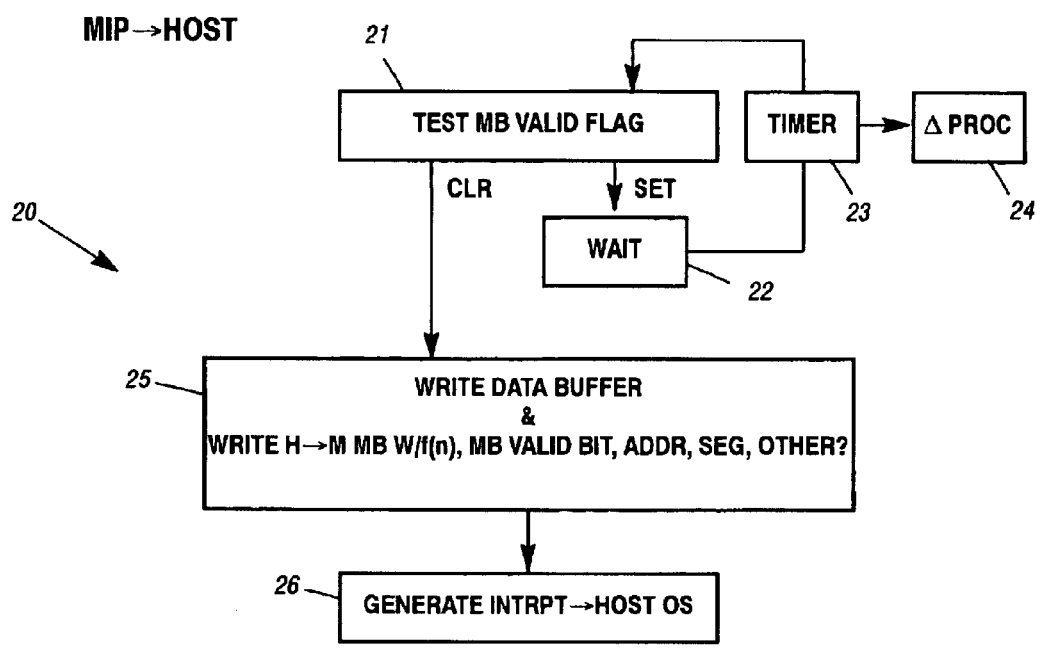

In FIG. 9, the MIP→Host communications process 20 is set out. Here too, the mailbox written to by the MIP will be polled or tested for a valid flag. If it is set the process will wait 22 for a sufficient period as may be set by a user or by the manufacturer, but past that period 23, the IMS software controlling the MIP will have the ability to adapt to the failed communication. This may be by recording a system failure, attempting to restart, calling for service, and the like as may be best in the situation.

Assuming normal communications, there will be a cleared valid bit or flag found at step 21 and the MIP will write any needed data to the data buffer, and then write the Host→MIP mailbox with the function code, set the valid bit, and fill in any needed addresses or sequence codes and the like to generate its message in accord with the protocol described previously.

In the preferred embodiments, the MIP will also generate an interrupt to signal the Host to look at its mailbox to retrieve the MIP→Host message.

Initialization and Boot. A preferred process for completing the set up operation for a multi-partitioned multiprocessor computer system is described in some detail in U.S. patent application Ser. No. 09/362,388, entitled, "METHOD AND APPARATUS FOR INITIATING EXECUTION OF AN APPLICATION PROCESSOR IN A CLUSTERED MULTIPROCESSOR SYSTEM", hereby incorporated herein by this reference in its entirety, and therefore this procedure is not described again here. However it is the kind of conversation or dialog that is facilitated by the inventive protocol, so it will be referred to here briefly for that purpose.

The MIP starts the system by de-asserting a reset signal for a particular Sub-POD allowing that group of processors to determine which one is the master BSP (Boot Strap Processor), which will then use the Sub-POD mailbox for that Sub-POD. Once this is completed, the BSP will send a message "Cluster-Check-In Complete" Message 9, to the Sub-POD mailbox. The MIP will use that information to control the overall computer system partition configuration and resources, based on criteria specified for this computer system in the IMS (Integrated Management System) software that is running on the MIP. Thus it will determine which BSP within a given partition is to be named the BSP of that partition, after de-asserting the reset signal for (releasing) as many Sub-PODs as it will specify for the given partition. Using the protocol, the MIP will reply with an acknowledgement message to the BSP of a released Sub-POD, and after deciding which one of the available BSP's in the partition is to be the BSP for the partition, it will send messages to each Sub-POD mailbox within the partition of either a Become BSP M2 message or Become AP M1 message variety. (Obviously only one of the contending BSP's will be the BSP of the partition so only one Become BSP message will be sent for the partition). In both cases the reply message indicates merely success or failure of the message delivery, presuming the BSP will follow this instruction if it can. It should be noted that the MIP will send a Become BSP message to a single mailbox first before sending messages out to the other Sub-PODS to become AP's so that the BSP can set up its resources and confirm with a Release AP's message 4, that it is ready to be the BSP for the partition. One could use the Switch to Partition Mailbox message 5, from the BSP host to the MIP to tell the MIP to go check it out and reply with a good or not good indication in the reply message in the old mailbox. It is possible to use the Move Mailbox message 23 or combine the two since their function is so similar. Either way, once the partition mailbox use has been established, the BIOS to OS transition can take place, with the BSP host for the partition running its BIOS, and when ready, sending the MIP the BIOS to OS Transition message.

In the preferred embodiment, the MIP will have loaded the BIOS into main memory for each partition. The BIOS is located in a file on the MIP hard disk. The file contains the BIOS code and information on where to load the BIOS. The MIP loads the BIOS in main memory using the information from the BIOS file. Multiple segments may be loaded by the MIP from the BIOS file at designated addresses specified in the file. The load of the BIOS configuration data area, in main memory is preferably at the address 0xF200. This loading is done before the de-assertion of the reset for the Sub-PODs.

Additionally in the preferred embodiment, the BSP on the first Sub-POD let out of reset negotiates the mailbox version allowing the BIOS to issue the Negotiate Mailbox Version message 24 to the MIP. The BIOS writes the host to MIP mailbox for the Sub-POD (Cluster) with the Negotiate Mailbox Version message, the data includes the minimum and maximum version supported by the BIOS.

The MIP clears the mailbox valid bit. The MIP returns the version selected for the Mailbox in the status of the Negotiate Mailbox Version response. This is the version that will be used for all of the messages between the host BIOS for this BSP and the MIP. The version applies to both the mailbox format and the message data format.

The MIP will maintain under IMS control, an indication of the BSP processor for use during the operation of the partition, to allow the partition to be rebooted if needed, and to perform other useful functions.

The MIP provides a list of the IPs to remove from the MP Table in the mailbox. The default is to indicate the IPs that failed to start. If a flag to allow the down of a Sub-POD on an IP failure during boot, then the data will indicate all IPs on the Sub-POD.

The MIP initializes the BSP Sub-POD to direct the range between A__0000-B__FFFF to direct accesses to the Compatibility DIB. BIOS begins VGA execution from the ROM. The shadow of the video ROM to C__0000 to C__7FFF is performed by the BIOS writing the base register in the PCI card to a higher memory mapped address, the data is read from the card and written to main memory at address C__0000. If the BIOS decided to write protect the shadowed video ROM area, the BIOS will issue the Shadow ROM message 8 to the MIP. The BSP host allows its BIOS to issue the Shadow ROM message to the MIP to set the video ROM range register to the mode where the reads are from main memory and the writes to ROM (DIB). The MIP halts the Sub-POD. The MIP then writes the register in the Sub-POD and resumes the Sub-POD, writing the message response indicating completion.

(These addresses are details of the Intel PC boot requirements. The compatibility DIB is the DIB (PCI-BRIDGE) which contains special hardware called the CPB (Compatibility Board). This special hardware is required to boot an Intel based system under Windows and/or UnixWare. In addition, each partition may have at most one instance of this hardware. More than one DIB may actually contain this hardware. In order to adhere to the "at most one" requirement above, redundant instances of the Compatibility hardware are disabled so that only one instance is usable in any partition. The compatibility DIB is the one containing the compatibility hardware which is to be used for this partition.)

In the CMP platform, the MIP tests and verifies main memory as a part of the MSU initialization, instead of the BIOS.

The BIOS issues the Release APs message to the MIP.

Each AP (Application Processor or just processor) is in a loop waiting for a fixed value to be written in a safe memory location by the host OS. The write of this memory location releases the processor for execution by the host OS. The safe address is selected by the BIOS in the BIOS memory area and is passed to the host in the OEM Table. In the preferred embodiment system, which we sometimes call a CMP platform, the execution of a HALT instruction and then the usage of the STARTUP IPI cannot be done due to the Hierarchical APIC structure and the platform does not support physical APIC mode.

The BIOS scans for expansion ROMs, and initializes and shadows the boot device expansion ROMs using the following procedure:

The MIP initializes the Sub-POD range registers to direct the range between C__0000-D__FFFF to the mode where the reads and writes are from RAM (main memory). The shadow of the expansion ROMs to the C__0000 to D__FFFF range is performed by the BIOS writing the base register in the PCI card to a higher memory-mapped address, the data is read from the card then written to main memory at the address in the range between C__0000 to D__FFFF. If the BIOS decides to write protect the shadowed expansion ROM area, the BIOS will issue the Shadow ROM message to the MIP.

BIOS issues the Shadow ROM message to the MIP to set the appropriate range register(s) to the mode where the reads are from main memory and the writes to ROM (DIB).

MIP halts the Sub-POD.

MIP writes the register(s) in the Sub-POD and resumes the Sub-POD.

MIP writes the message response indicating completion.

The BIOS enables hardware interrupts.

4. Conclusion

We have described a system for communicating between any host processor in a multi-host multiprocessor system which includes a protocol useable with Intel brand processors. It should be recalled that a Host processor may include a BSP and a plurality or multiplicity of subordinate processors we called APs in a preferred embodiment running computer system. The protocol requires a messaging delivery system which we describe as a mailbox pair or channel that can reside in the host memory, accessible by a management processor with independent memory. Numerous specific pairs of messages are described which are of four basic varieties, filling out the possible combinations of messages with buffer pointers and those without. Details of how the management processor gets information into and out of the host's memory locations is described also. Other processor types may be used with this system and other computer system configurations may also take advantage of the teachings provided herein. Accordingly, the scope of the invention is only limited by the following appended claims.

What is claimed is:

1. For use in a computer system having at least two HOST processors and at least one MIP management processor, a communications system for supporting communications between the MIP management processor and partition-identifiable ones of said at least two HOST processors comprising:

a main memory system accessible by all of the at least one HOST processors;

a set of relocatable mailbox pairs, each said mailbox pair for establishing a communications channel between said partition-identifiable ones of said at least two HOST processors and said MIP management processor, each of said set of mailbox pairs including two mailbox memory locations within said main memory system, and arranged to form a first mailbox being accessible for writing data to it by said one of said at least two HOST processors and a second mailbox being accessible for writing data to it only by said MIP management processor, and a protocol for communicating between the MIP management processor and said one said at least two HOST processors through said communications channel, said protocol including at least a message pair for each communication wherein each message pair comprises a request message and a reply message, wherein both'the request and the reply messages of a message pair in any said each communication comprises code written to said first mailbox by a HOST processor when a message in said pair is to be transmitted from a HOST processor to said MIP management processor, and code to be written to said second mailbox by the MIP management processor when a message in said pair is to be transmitted from the MIP management processor to said one of said at least two HOST processors, and wherein said written code includes a validity signal indicating message validity for any instantiation, a function signal indicating a message function for any instantiation of any request message, and either data signals representing message function-mediating information or a pointer to an address in said main memory where such function-mediating information can be found.

2. A communications system as set forth in claim 1, wherein each mailbox pair is useable only for communications between the MIP management processor and said partition-identifiable ones of said at least two host processors.

3. A communications system as set forth in claim 2, and wherein the locations for an initial mailbox pair is established during a boot up routine by each host processor BIOS.

4. A communications system as set forth in claim 3, wherein each mailbox pair is relocatable to a new pair of locations within said main memory system by agreement between said MIP management processor using the communications channel of the initial mailbox pair for communications between said MIP processor and said one of said at least two host processors, and wherein said one of said at least two host processors identifies said new pair of locations and communicates that address to said MIP processor via a request message pair initiated by said one of said at least two host processors.

5. A communications system comprising as set forth in claim 1 wherein said validity data signal in a MIP processor originated message may be reset by said one of at least two host processors when said one of said at least two host processors has received a message sent by said MIP processor.

6. A communications system comprising as set forth in claim 5, wherein said resetting is accomplished in said second mailbox.

7. A communications system comprising as set forth in claim 5 wherein said validity data signal may be reset by the MIP processor in a message sent by a host processor to said MIP processor.

8. A communications system as set forth in claim 1 wherein said request message of said message pair further comprises a routing code, and wherein the message pair to said written message incorporates said routing code.

9. A communications system as set forth in claim 1 wherein said reply message further comprises a status code indicating the status of the request determined by the processor receiving the request message of the message pair to which said reply written message is a reply.

10. A communications system as set forth in claim 1 wherein said request written message further comprises a sequence number.

11. A communications system as set forth in claim 1 wherein said each communication further comprises at least a second message pair.

12. A communications system as set forth in claim 1 wherein said HOST to MIP messages available to said system include at least 4 of the list of HOST to MIP messages comprising;

(NOP, Save CMOS Image, BIOS to OS Transition, Release APs, Switch to Partition Mailbox, Load Code, Map Memory, Shadow ROM, Cluster Check-in Complete, Report Fault, Write Protect BIOS/Extended BIOS Area, Switch to APIC Mode, Enable Unsolicited Messages, Enable MIP Interrupts, Heartbeat, Heartbeat Enable, MIP I/O Redirection Table—Modify, Select Sub-POD for lowest Priority, Shutdown, Change Partitioning State, Request Unit Configuration Data & Status, Request Attributes—Shared Memory, Move Mailbox, Negotiate Mailbox Version, Save and Distribute Partition Data, Request Partition Data, Report Event to MIP for Notification, Software Check-in, Request Down Memory Ranges), and wherein said MIP to HOST message include at least 2 MIP to HOST messages, drawn from the list of reply messages comprising:

(Become AP, Become BSP, Orderly Halt, MAP available, Request Partitioning Change, Down Memory Range Notification, Host Notification—Shared Memory, Notification of Configuration Change, Partition Data Notification, Report Fault).

13. A method for communicating between a management processor and any partition-identifiable host processor in a multi-host multiprocessor computer system comprising:

establishing a mailbox pair as memory locations in a shared main memory shared by said multi-host multiprocessor computer system, for handling message traffic between said management processor and one of said host processors, a first box of said pair for receiving messages only from said management processor and for being read by said one of said host processors, and a second box of said pair for receiving messages from said one to said host processors and for being read by said management processor, before writing a request message into either said first or second box, checking to see if the box is available, writing by a request message into the box checked in the previous action, if said box is available, or checking again until it is available or until a timeout, reading, responsive to a self-directed polling process, from the mailbox by said processor HOST or MIP that did not write said request message into the box, acting on information in said request message by the processor that read said request message and replying by the processor that read said request message by writing a response message into the other of said boxes.

14. The method of claim 13 further comprising the actions of:

resetting a valid bit in said request message by the processor that reads said request message.

15. The method of claim 13 wherein said act of establishing comprises establishing a unique mailbox pair in said shared memory for each host.

16. The method of claim 13 wherein said step of replying further comprises, first checking the one of said first or second boxes which will be used by the processor writing the reply message to see if the box is available.

17. The method of claim 13 wherein the request message written by the host is a request to the management processor to save an image file of the host CMOS memory information, and wherein the request message written contains an address for a buffer in said main memory where said host has written a copy of its CMOS memory, and wherein said management processor's responsive action is saving said image file of said buffer in a management processor memory.

18. The method of claim 13 wherein the request message written by the host is a request to the management processor to report unit configuration data and status, and wherein the request message written contains an address for a buffer in said main memory where said host has written a list of units being inquired about, and wherein said management processor's action is to place answers to the query for the units referred to in said buffer in a second buffer, and wherein said management reply message is written with an address for said second buffer.

19. The method of claim 13 wherein the request message written by the host is a request to the management processor to report memory unit attributes, and wherein the request message written contains an indication of which memory units are subject to this request message, and wherein said management processor's action is to place answers to the query for the units referred to in a buffer, and wherein said management reply message is written with an address for said buffer.

20. The method of claim 13 wherein the request message written by the host is a request to the management processor to negotiate mailbox communications level version, and wherein the request message written a highest level version which said host is capable of using, and wherein said management processor's action is to write in a reply message which version is accepted by said management processor and its associated software.

21. The method of claim 13 wherein said messages written by the Host operate to perform a function within the computer system, said function described by names of messages in the list of messages comprising;

(NOP, Save CMOS Image, BIOS to OS Transition, Release APs, Switch to Partition Mailbox, Load Code, Map Memory, Shadow ROM, Cluster Check-in Complete, Report Fault, Write Protect BIOS/Extended BIOS Area, Switch to APIC Mode, Enable Unsolicited Messages, Enable MIP Interrupts, Heartbeat, Heartbeat Enable, MIP I/O Redirection Table—Modify, Select Sub-POD for lowest Priority, Shutdown, Change Partitioning State, Request Unit Configuration Data & Status, Request Attributes—Shared Memory, Move Mailbox, Negotiate Mailbox Version, Save and Distribute Partition Data, Request Partition Data, Report Event to MIP for Notification, Software Check-in, Request Down Memory Ranges), and wherein said messages written by the MIP wherein said messages written by the Host operate to perform a function within the computer system, said function described by names of messages in the list of messages comprising;

(Become AP, Become BSP, Orderly Halt, MAP available, Request Partitioning Change, Down Memory Range Notification, Host Notification—Shared Memory, Notificaton of Configuration Change, Partition Data Notification, Report Fault).

22. A messaging protocol for communications between a host processor and a management processor in a computer system wherein:

all host processors in said system share a common main memory, said protocol relying on individual communications channels between each host processor and said management processor, wherein each said channel comprises a pair of mailboxes, a first box of said pair being for one of the host processor's outbound communications messages to said management processor, and a second box of said pair being for outbound communications messages from said management processor to said one of the host processors, and wherein mailbox pair for said one of the host processors is located in a partition controlled by said one of the host processors, the messages in said protocol comprising paired messages, wherein outbound messages from a host processor are not equivalent to the outbound messages from the management processor, but wherein there are at least four forms of message pairs, each pair having a request message and a reply message, a first form being a request message having no pointer to a buffer paired with a reply message with a pointer to a buffer, a second form being a request message having a pointer to a buffer paired with a reply message having a pointer to a buffer, a third message pair being a request message having no pointer to a buffer being paired with a reply message having no pointer to a buffer, and a fourth form having a request message with a pointer to a buffer being paired with a reply message having no pointer to a buffer.

23. The protocol of claim 22 wherein said Host outbound request messages are drawn from a list comprising at least 4 of the list of messages comprising;

(NOP, Save CMOS Image, BIOS to OS Transition, Release APs, Switch to Partition Mailbox, Load Code, Map Memory, Shadow ROM, Cluster Check-in Complete, Report Fault, Write Protect BIOS/Extended BIOS Area, Switch to APIC Mode, Enable Unsolicited Messages, Enable MIP Interrupts, Heartbeat, Heartbeat Enable, MIP I/O Redirection Table—Modify, Select Sub-POD for lowest Priority, Shutdown, Change Partitioning State, Request Unit Configuration Data & Status, Request Attributes—Shared Memory, Move Mailbox, Negotiate Mailbox Version, Save and Distribute Partition Data, Request Partition Data, Report Event to MIP for Notification, Software Check-in, Request Down Memory Ranges), and wherein said MIP outbound request messages are drawn from a list comprising at least 2 messages, drawn from the list of reply messages comprising:

(Become AP, Become BSP, Orderly Halt, MAP available, Request Partitioning Change, Down Memory Range Notification, Host Notification—Shared Memory, Notification of Configuration Change, Partition Data Notification, Report Fault).

* * * * *